(12) United States Patent
Roennow et al.

(10) Patent No.: US 11,196,573 B2
(45) Date of Patent: Dec. 7, 2021

(54) SECURE DE-CENTRALIZED DOMAIN NAME SYSTEM

(71) Applicant: Nokia Technologies Oy, Espoo (FI)

(72) Inventors: Troels Roennow, Cambridge (GB); Enrique Martin Lopez, Cambridge (GB); Hongwei Li, Cambridge (GB); Karina Palyutina, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 84 days.

(21) Appl. No.: 16/491,053

(22) PCT Filed: Mar. 6, 2017

(86) PCT No.: PCT/FI2017/050152
§ 371 (c)(1),
(2) Date: Sep. 4, 2019

(87) PCT Pub. No.: WO2018/162789
PCT Pub. Date: Sep. 13, 2018

(65) Prior Publication Data
US 2020/0021446 A1 Jan. 16, 2020

(51) Int. Cl.
*H04L 29/06* (2006.01)
*H04L 9/00* (2006.01)
(Continued)

(52) U.S. Cl.
CPC .......... *H04L 9/3268* (2013.01); *H04L 9/006* (2013.01); *H04L 9/0637* (2013.01);
(Continued)

(58) Field of Classification Search
CPC ..... H04L 9/3268; H04L 9/006; H04L 9/0637; H04L 9/0869; H04L 63/0435;
(Continued)

(56) References Cited

U.S. PATENT DOCUMENTS

2016/0191243 A1 6/2016 Manning
2016/0294783 A1* 10/2016 Piqueras Jover ..... H04L 9/3271
(Continued)

OTHER PUBLICATIONS

Stephanos Matsumoto et al., "IKR Turning a PKI Around with Blockchains", 2016, Internation Assocation for cryttologic research, vol. 20161027:211034, pp. 1-33 (Year: 2016).*
(Continued)

*Primary Examiner* — Shewaye Gelagay
*Assistant Examiner* — Kevin Ayala
(74) *Attorney, Agent, or Firm* — Harrington & Smith

(57) ABSTRACT

A computer-implemented method for secure de-centralized domain name system, the method comprising: recording a domain registration transaction to a blockchain, the domain registration transaction comprising a domain name, a domain primary key corresponding to a domain public key and domain certificate information for a server node; recording a domain security transaction, comprising the domain public key, to the blockchain to generate a domain name record comprising the domain name, an associated IP address, the domain public key and the domain certificate information, wherein the domain security transaction being signed using the domain primary key; transmitting, by a client node, a domain name request to a domain name node; receiving, by the client node, a domain name response from the domain name node, the domain name response comprising the domain public key, the domain certificate information and the associated IP address retrieved from the domain name record of the blockchain; and initiating a secure communication between the client node and the server node using at least one of the domain public key and the domain certificate information.

15 Claims, 6 Drawing Sheets

(51) Int. Cl.
*H04L 9/32* (2006.01)
*H04L 9/06* (2006.01)
*H04L 9/08* (2006.01)
*G06F 16/27* (2019.01)

(52) U.S. Cl.
CPC ........ *H04L 9/0869* (2013.01); *H04L 63/0435* (2013.01); *H04L 63/0478* (2013.01); *H04L 63/061* (2013.01); *G06F 16/27* (2019.01); *H04L 2209/38* (2013.01)

(58) Field of Classification Search
CPC ............... H04L 63/0478; H04L 63/061; H04L 2209/38; H04L 9/3239; H04L 9/3247; H04L 9/002; H04L 9/0819; H04L 9/0891; H04L 9/3263; H04L 63/1458; G06F 16/27
See application file for complete search history.

(56) References Cited

U.S. PATENT DOCUMENTS

| 2017/0236123 | A1* | 8/2017 | Ali | G06Q 20/3825 705/75 |
| 2017/0346848 | A1* | 11/2017 | Smith | H04L 63/06 |
| 2019/0005470 | A1* | 1/2019 | Uhr | G06Q 20/02 |

OTHER PUBLICATIONS

Benshoof et al., "Distributed Decentralized Domain Name Service", 2016, IEEE, pp. 1279-1287 (Year: 2016).*

"SSL Pulse", SSL Labs, Retrieved on Aug. 29, 2019, Webpage available at: https://www.ssllabs.com/ssl-pulse/.

"Alternative DNS root", Wikipedia, Retrieved on Aug. 29, 2019, Webpage available at: https://en.wikipedia.org/wiki/Alternative_DNS_root.

"Security in Decentralized Domain Name Systems", Lets Talk Bit Coin, Retrieved on Aug. 29, 2019, Webpage available at: https://letstalkbitcoin.com/blog/post/security-in-decentralized-domain-name-systems.

"What is DNSChain?", GitHub, Retrieved on Aug. 29, 2019, Webpage available at: https://github.com/okTurtles/dnschain/blob/master/docs/What-is-it.md.

Benshoof et al., "Distributed Decentralized Domain Name Service", IEEE International Parallel and Distributed Processing Symposium Workshops (IPDPSW), May 23-27, 2016, pp. 1279-1287.

Jabczynski et al., "Orwell. From Bitcoin to Secure Domain Name System", Human Language Technologies as a Challenge for Computer Science and Linguistics, Proceedings of 7th Language and Technology Conference, 2015, pp. 423-427.

"OkTurtles", okTurtles Foundation, Retrieved on Aug. 29, 2019, Webpage available at: https://okturtles.com/.

International Search Report and Written Opinion received for corresponding Patent Cooperation Treaty Application No. PCT/FI2017/050152, dated Nov. 7, 2017, 11 pages.

Fromknecht et al., "CertCoin: A NameCoin Based Decentralized Authentication System 6.857 Class Project", MIT Computer Science and Artificial Intelligence Laboratory, May 14, 2014, pp. 1-19.

Matsumoto et al., "IKP: Turning a PKI Around with Blockchains", International Association for Cryptologic Research, 2016, 33 pages.

Ali et al., "Blockstack: A Global Naming and Storage System Secured by Blockchains", Proceedings of the 2016 USENIX Conference on Usenix Annual Technical Conference, Jun. 22-24, 2016, pp. 181-194.

Office action received for corresponding European Patent Application No. 17713991.2, dated Nov. 4, 2020, 5 pages.

* cited by examiner

SECURE DE-CENTRALIZED DOMAIN NAME SYSTEM

RELATED APPLICATION

This application was originally filed as Patent Cooperation Treaty Application No. PCT/FI2017/050152 filed Mar. 6, 2017.

TECHNICAL FIELD

The present application generally relates to a secure de-centralized domain name system, blockchains, distributed ledgers, secure communication between nodes and cryptographic protocols.

BACKGROUND

This section illustrates useful background information without admission of any technique described herein representative of the state of the art.

The Domain Name System (DNS) is a hierarchical decentralized naming system for computers, services, or any resource connected to the Internet or a private network. It associates various information with domain names assigned to each of the participating entities. Most prominently, it translates more readily memorized domain names to the numerical IP addresses needed for the purpose of locating and identifying computer services and devices with the underlying network protocols. By providing a worldwide, distributed directory service, the Domain Name System (DNS) is a fundamental component of the functionality of the Internet.

The Hypertext Transfer Protocol (HTTP) is an application protocol for distributed, collaborative, hypermedia information systems. HTTP is the foundation of data communication for the World Wide Web. However, HTTP uses only plain-text in the protocol, even for basic access authentication. For secure information exchanges over the Internet, secure HTTP (HTTPS) was implemented. HTTPS consists of common HTTP communication encrypted by Transport Layer Security (TLS) or its predecessor, Secure Sockets Layer (SSL). The main motivation for HTTPS is authentication of the visited website and protection of the privacy and integrity of the exchanged data.

Denial of Service (DoS) attack and Man-in-the Middle (MITM) attack are two popular cyber-attacks over the Internet. More popular nowadays, Distributed DoS (DDoS) is a type of DoS attack where multiple compromised systems, which are often infected with a Trojan, are used to target a single system to bring the network down by flooding it with useless traffic. Domain Name System (DNS) services use de-centralized setup with multiple mirror sites to defend against DDoS.

Man-in-the Middle (MITM) is where the attacker secretly relays and possibly alters the communication between two parties who believe they are directly communicating with each other. This attack can happen to any two-party-communication and various authentication techniques have been developed to defend against it.

Current Internet infrastructure is composed of several independent layers. For HTTPS to work, DNS and certificate based security services need to be sorted out separately and there are several independent and unrelated parties involved in the process.

First, the domain name of the website needs to be registered with a domain name registrar (this can also be done through resellers). When the domain is registered, it will appear in domain registry and available for DNS service that could be provided by registrar for free or by someone else.

Then, the owner of the domain/website server needs to purchase security certificate from one of the thousand Certificate Authorities (CA's), a trusted third party (TTP), and install the certificate on the hosting server.

Today, there exist some 1200 Certificate Authorities (CA's) that can sign certificates for domains that will be accepted by almost any browser. This causes some problems. Although becoming a Certificate Authority (CA) involves undergoing many formalities, they can be leaned on by governments, intimidated by crooks, or hacked by criminals to issue false certificates.

If the browser visits a compromised website and is presented with what looks like a valid HTTPS certificate, it will initiate what it thinks is a secure connection and may display a padlock in the address bar, for example. The problem is that only one of the 1200+ Certificate Authorities (CA's) needs to have been compromised for the browser to accept the connection.

There are many ways to break HTTPS/TLS/SSL today, even when websites do everything right. As currently implemented, the Web's security protocols may be good enough to protect against attackers with limited time and motivation, but they are inadequate for a world in which geopolitical and business contests are increasingly being played out through attacks against the security of computer systems.

A blockchain is a distributed database that maintains a continuously growing list of data records hardened against tampering and revision. It consists of data structure blocks, which hold exclusively data in initial blockchain implementations, and both data and programs in some implementations, with each block holding batches of individual transactions and the results of any blockchain executables. Each block contains a timestamp and information linking it to a previous block.

The blockchain is seen as the main technical innovation of bitcoin, where it serves as the public ledger of all bitcoin transactions. Bitcoin is peer-to-peer, every user is allowed to connect to the network, send new transactions to it, verify transactions, and create new blocks, which is why it is called permissionless. This original design has been the inspiration for other cryptocurrencies and distributed databases.

The Certificate Authorities are a single point of failure that can be attacked or corrupted.

Thus, a technical solution is needed to solve the problem of improving secure communication between network nodes.

SUMMARY

Various aspects of examples of the invention are set out in the claims.

According to a first example aspect of the present invention, there is provided a computer-implemented method for secure de-centralized domain name system, the method comprising:

recording a domain registration transaction to a blockchain, the domain registration transaction comprising a domain name, a domain primary key corresponding to a domain public key and domain certificate information for a server node;

recording a domain security transaction, comprising the domain public key, to the blockchain to generate a domain name record comprising the domain name, an associated IP address, the domain public key and the domain certificate information, wherein the domain security transaction being signed using the domain primary key;

transmitting, by a client node, a domain name request to a domain name node;

receiving, by the client node, a domain name response from the domain name node, the domain name response comprising the domain public key, the domain certificate information and the associated IP address retrieved from the domain name record of the blockchain; and initiating a secure communication between the client node and the server node using at least one of the domain public key and the domain certificate information.

In an embodiment, the domain registration transaction further comprises deposit information associated with the domain. At every nth block an amount corresponding to the deposit information may be withdrawn in response to domain registration and deposited to miners of a blockchain network.

In an embodiment, the method further comprises:
encrypting the domain registration transaction using a random number; and
releasing the random number to the blockchain in response to the domain registration transaction being confirmed into the blockchain according to a security protocol of the de-centralized domain name system.

In an embodiment, the domain security transaction is recorded to the blockchain according to a security protocol of the de-centralized domain name system.

In an embodiment, the security protocol comprises at least one of the following: Proof-of-Work (PoW), Proof-of-Stake (PoS), Practical Byzantine Fault Tolerance (PBFT) and majority-voting algorithm.

In an embodiment, the domain name request comprises at least one of the following: a domain name and an IP address associated with the domain name.

In an embodiment, the method further comprises:
encrypting, by the client node, a random value using a shared secret and transmitting the encrypted random value to the server node;
decrypting, by the server node, the encrypted random value and signing the decrypted random value using a private key of the server node, encrypting the signed random value using the shared secret and transmitting the encrypted signed random value to the client node;
decrypting, by the client node, the encrypted signed random value using the shared secret to generate the signed random value;
combining, by the client node, the signed random value with the domain public key of the server node to verify the server node; and
utilizing the random value for encrypting data of the secure communication between the client node and the server node.

In an embodiment, the method further comprises:
transmitting, by the client node, a public key of the client node to the server node;
encrypting, by the server node, the domain public key and the domain certificate information using the public key of the client node to provide encrypted response and transmitting the encrypted response to the client node;
decrypting, by the client node, the encrypted response using a private key of the client node to generate the domain public key and the domain certificate information, comparing the generated domain certificate information to the domain certificate information received from the domain name node to verify the server node;

generating, by the client node, a session key in response to verifying the server node, encrypting the session key using the domain public key, and transmitting the encrypted session key to the server node;

decrypting, by the server node, the encrypted session key using a domain private key; and utilizing the session key for encrypting data of the secure communication between the client node and the server node.

In an embodiment, the method further comprises:
receiving a renewal request for the domain name record of the blockchain;
receiving a domain renewal transaction comprising update to the domain name record; and
recording the domain renewal transaction in response to the transaction being confirmed into the blockchain according to a security protocol of the de-centralized domain name system.

In an embodiment, the blockchain of the secure de-centralized domain name system comprises a plurality of blockchain node layers.

In an embodiment, the plurality of blockchain node layers comprises:
a domain name node layer;
a server node layer; and
a client node layer.

In an embodiment, the domain name node layer comprises at least one domain name node configured to control the domain name system and the domain certificate information of the server nodes.

In an embodiment, the server node layer comprises at least one server node configured to register with the domain name node layer.

In an embodiment, the client node layer comprises at least one client node configured to query and respond with the domain name node layer for utilizing secure communication with the server node layer.

In an embodiment, the client node comprises a browser application.

In an embodiment, the method further comprises:
defining a record within the blockchain, the record identifying at least one trusted node, wherein the trusted node being identified by a unique node identifier.

In an embodiment, the unique identifier comprises a public key, the public key associated with a secret key stored in the trusted node.

In an embodiment, the method further comprises:
generating a pair of the public and the secret key at each node.

In an embodiment, the method further comprises:
storing the secret key within a secure element at the node, the secure element comprising a separate electronic module with limited input/output within the node.

In an embodiment, the method further comprises:
defining a domain name record within the blockchain, the domain name record comprising the domain name, the associated IP address, the domain public key and the domain certificate information.

In an embodiment, the method further comprises:
receiving a request to add or remove a node to at least one blockchain node layer;
publishing the request as a transaction to a second node of at least one blockchain node layer via a distributed consensus system comprised of the plurality of nodes; and recording addition or removal of the node as transaction to the blockchain in response to the request transaction being confirmed by the second node according to the distributed consensus system.

In an embodiment, the method further comprises:
selecting the second node based on security criteria.
In an embodiment, the method further comprises:
facilitating verification and authentication of transactions of the nodes according to terms of pre-defined settings of the blockchain.

In an embodiment, at least one node comprises an IoT (Internet of Things) device.

In an embodiment, at least one node is connected to a wide area communication interface comprising a public network.

In an embodiment, a blockchain transaction comprises:
a public key of a node; and
a hash value of a data item.
In an embodiment, the method further comprises:
signing the data item by a first node; and
recording the signed data item as a transaction to the blockchain in response to signing the data item by the first node.

According to a second example aspect of the present invention, there is provided a computer-implemented method for secure de-centralized domain name system, the method comprising:
 recording a domain registration transaction to a blockchain, the domain registration transaction comprising a domain name, a domain primary key corresponding to a domain public key and domain certificate information for a server node;
 recording a domain security transaction, comprising the domain public key, to the blockchain to generate a domain name record comprising the domain name, an associated IP address, the domain public key and the domain certificate information, wherein the domain security transaction being signed using the domain primary key;
 receiving, from a client node, a domain name request to a domain name node;
 transmitting, to the client node, a domain name response from the domain name node, the domain name response comprising the domain public key, the domain certificate information and the associated IP address retrieved from the domain name record of the blockchain, wherein a secure communication is configured to be initiated between the client node and the server node using at least one of the domain public key and the domain certificate information.

According to a third example aspect of the present invention, there is provided a server apparatus comprising:
 a communication interface for transceiving information;
 at least one processor; and
 at least one memory including computer program code;
 the at least one memory and the computer program code configured to, with the at least one processor, cause the server apparatus to:
  record a domain registration transaction to a blockchain, the domain registration transaction comprising a domain name, a domain primary key corresponding to a domain public key and domain certificate information for a server node;
  record a domain security transaction, comprising the domain public key, to the blockchain to generate a domain name record comprising the domain name, an associated IP address, the domain public key and the domain certificate information, wherein the domain security transaction being signed using the domain primary key;
  receive, from a client node, a domain name request to a domain name node;
  transmit, to the client node, a domain name response from the domain name node, the domain name response comprising the domain public key, the domain certificate information and the associated IP address retrieved from the domain name record of the blockchain, wherein a secure communication is configured to be initiated between the client node and the server node using at least one of the domain public key and the domain certificate information.

According to a fourth example aspect of the present invention, there is provided a device comprising:
 a communication interface for transceiving information;
 at least one processor; and
 at least one memory including computer program code;
 the at least one memory and the computer program code configured to, with the at least one processor, cause the device to:
  transmit, from a client node, a domain name request to a domain name node, wherein a domain registration transaction is recorded to a blockchain, the domain registration transaction comprising a domain name, a domain primary key corresponding to a domain public key and domain certificate information for a server node; and further wherein a domain security transaction, comprising the domain public key, is recorded to the blockchain to generate a domain name record comprising the domain name, an associated IP address, the domain public key and the domain certificate information, wherein the domain security transaction being signed using the domain primary key;
  receive, by the client node, a domain name response from the domain name node, the domain name response comprising the domain public key, the domain certificate information and the associated IP address retrieved from the domain name record of the blockchain; and
  initiate a secure communication between the client node and the server node using at least one of the domain public key and the domain certificate information.

In an embodiment, the device comprises at least one of the following:
 an industrial machine;
 a sensor;
 a personal computer;
 a smartphone;
 an Internet of Things (IoT) device.
 a Personal Digital Assistant (PDA);
 an Internet tablet;
 a network attached storage (NAS); and
 a user device.

According to a fifth example aspect of the present invention, there is provided a computer program embodied on a computer readable non-transitory medium comprising computer executable program code, which when executed by at least one processor of a server apparatus, causes the server apparatus to:
 record a domain registration transaction to a blockchain, the domain registration transaction comprising a domain name, a domain primary key corresponding to a domain public key and domain certificate information for a server node;

record a domain security transaction, comprising the domain public key, to the blockchain to generate a domain name record comprising the domain name, an associated IP address, the domain public key and the domain certificate information, wherein the domain security transaction being signed using the domain primary key;

receive, from a client node, a domain name request to a domain name node;

transmit, to the client node, a domain name response from the domain name node, the domain name response comprising the domain public key, the domain certificate information and the associated IP address retrieved from the domain name record of the blockchain, wherein a secure communication is configured to be initiated between the client node and the server node using at least one of the domain public key and the domain certificate information.

According to a sixth example aspect of the present invention, there is provided a computer program embodied on a computer readable non-transitory medium comprising computer executable program code, which when executed by at least one processor of a device, causes the device to:

transmit, from a client node, a domain name request to a domain name node, wherein a domain registration transaction is recorded to a blockchain, the domain registration transaction comprising a domain name, a domain primary key corresponding to a domain public key and domain certificate information for a server node; and further wherein a domain security transaction, comprising the domain public key, is recorded to the blockchain to generate a domain name record comprising the domain name, an associated IP address, the domain public key and the domain certificate information, wherein the domain security transaction being signed using the domain primary key;

receive, by the client node, a domain name response from the domain name node, the domain name response comprising the domain public key, the domain certificate information and the associated IP address retrieved from the domain name record of the blockchain; and initiate a secure communication between the client node and the server node using at least one of the domain public key and the domain certificate information.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
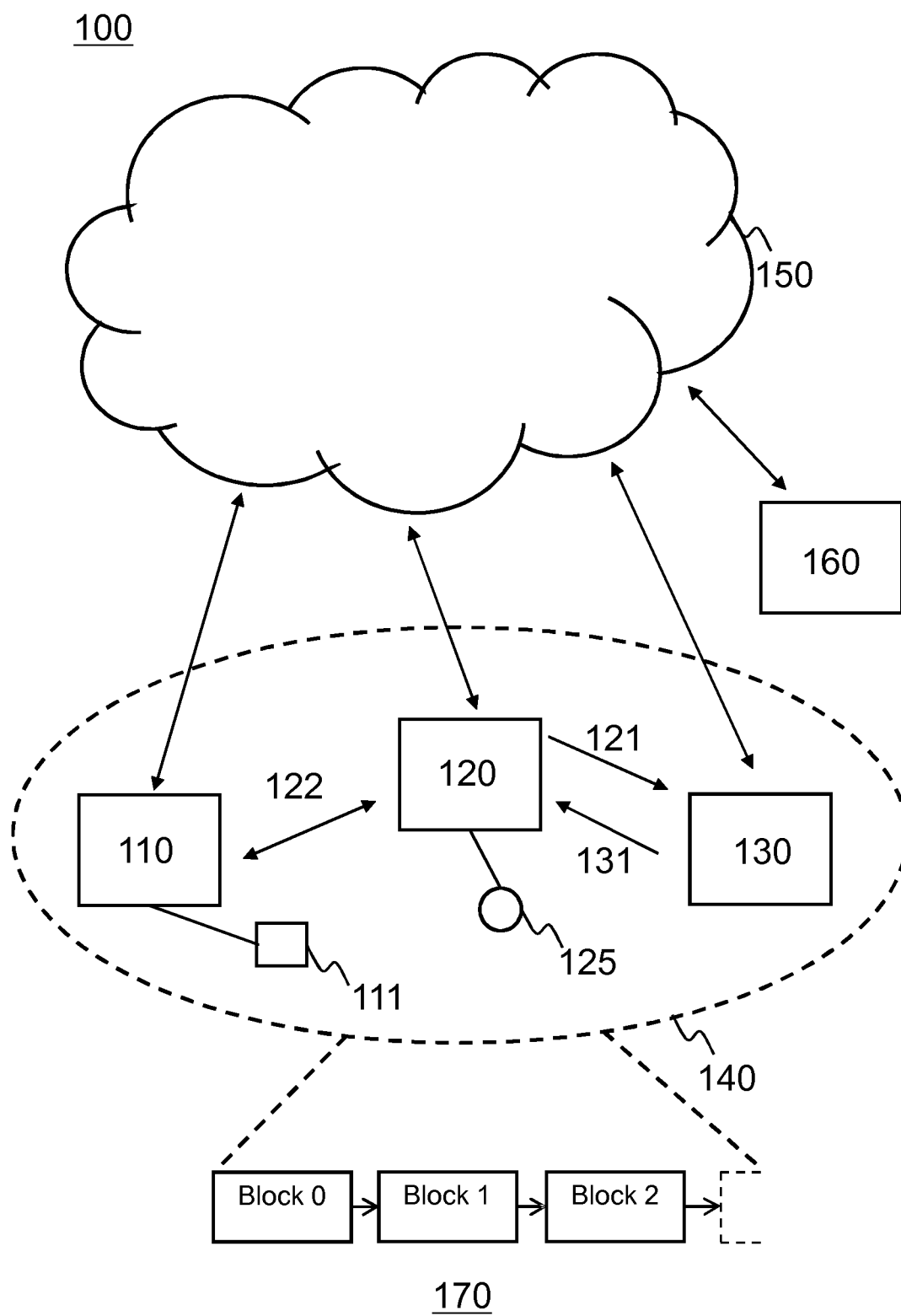
FIG. 1 shows a schematic drawing of a system of an example embodiment.

Example embodiments of the present invention and its potential advantages are understood by referring to FIGS. 1 through 6 of the drawings. In this document, like reference signs denote like parts or steps.

In this document, the terms couple and connect may refer to direct contact between components or to coupling through some intervening component(s).

When a user tries to visit secure HTTP (HTTPS) webpages, the following may happen. First, the browser may check with DNS server for IP address to find the website host. This service is provided by DNS name server available to the user device. Second, the browser may then go to the host web server with website record provided by DNS name server and request for a secure session. The browser will provide its public key to the server in this step. Third, the web server responds by sending over its public key and the certificate that contains information about the website and the Certificate Authority (CA). Fourth, the browser may then check if the certificate is valid or not (this depends on whether the CA can be trusted or not). After verification, the browser sends a one-time session key encrypted with the web server's public key. Fifth, the web server decrypts the one-time session key with its private key and from here on secure communication can be performed between the browser and the web server by using the one-time session key.

In the fourth step above, the web browser knows how to trust HTTPS websites based on Certificate Authorities (CA's) that come pre-installed with the browser. Certificate authorities (such as Symantec, Comodo, GoDaddy and GlobalSign) may in this way be trusted by the web browser creators to provide valid certificates. Therefore, a user should trust a HTTPS connection to a website if and only if the user trusts the browser software to correctly implement HTTPS with correctly pre-installed certificate authorities, the certificate authority to vouch only for legitimate websites, the website to provide a valid certificate that means it was signed by a trusted authority, the certificate to correctly identify the website (e.g., when the browser visits "https://example.com", the received certificate is for "example.com" exactly and not some other entity), and the user to trust that the protocol's encryption layer (SSL/TLS) is sufficiently secure against eavesdroppers.

HTTPS infrastructure uses the X.509 Public Key Infrastructure (PKI), an asymmetric key encryption system where a website server presents a public key, which is decrypted using a browser's private key. The digital public key certificates (TLS/SSL certificates) are used to protect the HTTPS connection against Man-in-the Middle (MITM) attacks.

A certificate is a small data file issued by a recognized Certificate Authority (CA) that certifies the ownership of a public key by the named subject of the certificate. In this way the certificate digitally binds a website's public cryptographic key to organization's details. In this process, the Certificate Authority (CA) is acting in cryptographic terms as a trusted third party (TTP). If a website shows the browser a certificate from a recognized Certificate Authority (CA), the browser may determine the website to be genuine and safe. However, current infrastructure is not immune to compromised Certificate Authority (CA), for example when a trusted third party (TTP) becomes untrustable.

Some alternative decentralized Domain Name System (DNS) solutions based on blockchain technology have been proposed. Such blockchain-based solutions may be more immune to Man-in-the Middle (MITM) attacks. However, such systems have still numerous limitations. First, they are not fully compatible with current Internet infrastructure for how Domain Name System (DNS) and security service are operated, requiring additional browsing software such as plugins or even independent browsers. Second, they require a local copy of the blockchain. Third, only some new top-level domains are supported.

Distributed ledger technology (DLT) known also as blockchain technology is used for improving security and usability. A blockchain is a distributed computing architecture, where every network node executes and records same transactions, which are grouped into blocks. Only one block can be added to the blockchain at a time, and every block contains a mathematical proof verifying that it follows in sequence from the previous block. Thus, blockchain "distributed database" is kept in consensus across the whole network. Individual user interactions with the ledger (transactions) are secured by strong cryptography. Nodes that maintain and verify the network may be incentivized by mathematically enforced economic incentives coded into the protocol.

In an embodiment, a blockchain can also be used privately, as a private blockchain, among all smart devices of one owner or among all Internet of Things (IoT) devices in a single household, for example. The private blockchain may be employed aiming to apply blockchain technology to management of smart devices for a single user (or family) including access rights to devices, services, applications, and maintaining and providing banking passwords, for example.

FIG. 1 shows a schematic drawing of a system 100 of an example embodiment.

In an embodiment, a blockchain-based solution is provided that solves limitations of known solutions. It provides Domain Name System (DNS) service and security features in a way that is compatible with current Internet infrastructure. In addition, it works directly from the end user's browser without downloading a copy of the blockchain, installing plugins, or requiring an independent browser, for example.

Since blockchain stores trusted data that is protected from unauthorized modification, it is a great foundation for the deployment of cryptographic Public Key Infrastructure (PKI) e.g. publish and maintain public keys for many cryptographic applications such as SSH/SSL certificates, proof-of-ownership timestamps or other distributed services.

In an embodiment, a blockchain based infrastructure combines Domain Name System (DNS) and security services into one. In such setup, the domain name registry database is recorded into a blockchain, together with its associated public key. Similar to current Domain Name System (DNS), the new blockchain based Domain Name System (DNS) is distributed and maintained among the service providers. The Domain Name System (DNS) servers are nodes of the blockchain.

Administrator(s) of the network may be a consortium of companies or one or more specialized organizations, for example.

At the minimum, the system 100 comprises at least one network node 110-130 for transceiving data within the system 100 over a public network 150, such as Internet.

FIG. 1 shows an embodiment of a network 150, which comprises a plurality of network nodes 110-130 and may be implemented by a plurality of information handling systems. In embodiments, an information handling system includes any instrumentality or aggregate of instrumentalities operable to compute, classify, process, transmit, receive, retrieve, originate, switch, route, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device, a smart package, or other electronic device, a network server, a network storage device, a database, a data system, a switch router or other network communication device, or any other suitable device and may vary in size, shape, performance, functionality, and price. Further, an information handling system may include processing resources for executing machine-executable code, such as a central processing unit (CPU), a programmable logic array (PLA), an embedded device such as a System-on-a-Chip, or other control logic hardware. An information handling system may also include one or more computer-readable media for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display.

A user may operate a client node 120 that may comprise a user device with a browser, for example. The user device may comprise such as home desktop, laptop, tablet, mobile phone or smartwatch, for example. Blockchain technology may be used to manage all those devices. Each device 110-130 corresponds to a node of a blockchain 170 defining a trusted domain name circle 140 comprising at least one node of a plurality of nodes 110-130.

In an embodiment, a secure de-centralized domain name system 100 further comprises a domain name node 130 for recording a domain registration transaction to a blockchain 170, the domain registration transaction comprising a domain name, a domain primary key and domain certificate information for a server node 110. The domain primary key may correspond to the public key of the intended domain owner, for example.

In an embodiment, when registering a domain, the domain primary key corresponds to the public key of the intended domain owner. The public key has a corresponding private key pair that allows signing transactions on the blockchain. Such transactions may involve monetary transactions, such as payment of fees to maintain the domain registration in the network.

In an embodiment, the domain primary key may correspond to any form of identification of the intended domain owner that allows its electronic authentication. This could be, for example, a shared secret with at least one DNS node.

In one embodiment, a domain primary key and domain certificate information may be combined as one key/certificate. In such case, different embodiments disclosed regarding the domain primary key is understood to comprise such combined key/certificate used for both purposes. Similarly, different embodiments disclosed regarding the domain certificate is understood to comprise such combined key/certificate used for both purposes.

In an embodiment, a server node 110 (e.g. a company web host) may deploy its own blockchain system 111 for its internal usage.

The domain name node 130 is further configured to record a domain security transaction, comprising a domain public key, to the blockchain 170 to generate a domain name record (for the server node 110) comprising the domain name, an associated IP address, the domain public key and the domain certificate information, wherein the domain security transaction is signed using the domain primary key.

In an embodiment, the client node 120 transmits a domain name request 121 to a domain name node 130. In response, the client node 120 receives a domain name response 131 from the domain name node 130, the domain name response 131 comprising the domain public key, the domain certificate information and the associated IP address retrieved from the domain name record of the blockchain 170. After that a secure communication is initiated between the client node 120 and the server node 110 using at least one of the domain public key and the domain certificate information. Just to simplify FIG. 1, the messages 121,122,131 are drawn between nodes 110-130 without travelling through the network 150.

In principle, the website/domain name, IP address, public key, and certificate information are recorded in the blockchain 170. For the owner of a domain (e.g. server node 110 and sub-domain 111), a domain purchase (registration) process combines both registration and security certificate purchasing.

In an embodiment, domain name data and security certificate data is recorded in the blockchain 170 and distributed/monitored among other nodes 110-130 of a trusted domain circle 140. The trusted domain circle 140 may be understood to comprise all nodes 110-130 recorded as nodes within the blockchain 170. Trusted circle 140 excludes untrusted nodes 160 not recorded within the blockchain 170. A domain name record within the blockchain 170 may comprise a domain name, an associated IP address, a domain public key and domain certificate information.

In an embodiment, nodes 110-130 may be recorded within the blockchain 170 to include, but is not limited to, device ID, name, type, owner, biometric capabilities of the device, biometric identifier of a user, usual location, access rights/level to sensitive information including passwords to websites and applications, and usage histories, for example.

Any node of the plurality of nodes 110-130 may have a public-private key pair that can be used for authentication and digital signature activities on the blockchain 170.

In an embodiment, any node 110-130, regardless of the blockchain node layer it belongs to, may be able to generate public-private key pair to interact with the system via its public key.

The network 140,150 represents a computing environment including a plurality of nodes 110,130 that may be accessed by any of the nodes 110-130. The system 100 maintains a distributed data structure, which may be referred to herein as a secure distributed transaction ledger or a blockchain 170 that may be utilized for accessing the nodes, their services provided or applications. This secure distributed transaction ledger may support various functions, such as distributing computational tasks from one or more systems to one or more other systems, supporting a cryptocurrency, messaging, among other functions. The nodes may comprise, for example, service provider systems requiring user registration and access control with secure user specific login/password information.

The node 120 may comprise a user device, an Internet of Things (IoT) device, a sensor, an integrated device or home electronics device, for example. The user device may also comprise a wrist-based device, a belt device, clothing-integrated device, or a biometric sensor, for example.

The system 100 may comprise a further node 160 not belonging to the trusted domain circle 140 but accessible to the network 150.

Any node 110-130 may generate transaction data relating to the node and hash the data using a cryptographic hashing function, to create a cryptographic hash block.

In an embodiment, the trusted circle 140 may comprise a gateway node 110,120 configured to control access of other node 111,125 within the trusted domain circle 140 to external network 150 outside the trusted domain circle 140.

In an embodiment, the gateway node 110 may receive data without hashing from other node 111 within the trusted domain circle 140 and carry out the data hashing using a cryptographic hashing function, to create a cryptographic hash block.

A node 110-130 may receive notification information comprising user identification information associated with the trusted circle 140. The notification information may be received, for example, from another node 110-130 over a local connection, or over a wide area connection 150 from a remote device 160. The local connection may be implemented, for example, via at least one of the following short-range communication protocol: Near Field Communication (NFC), Bluetooth™, Wi-Fi, Ethernet and Universal Serial Bus (USB).

Furthermore, a node 110-130 may receive instructions information to collaborate on a data storage comprising blockchain data of the trusted domain circle 140.

The system 100 may comprise nodes 160 that do not belong to any trusted circle 140. Such nodes 160 may communicate without secure connection with other nodes 110-130 within the system 100. The node 160 may be connected to a public network 150.

In an embodiment, the nodes 120, 125 are integrated as a single device. Alternatively, the gateway node 120 and another node 125 are separate entities and connected via a local short-range communication interface, and the gateway node 120 and a remote node 160 are connected via a wide area communication interface 150, for example. It is also possible to arrange the nodes 120,125 to be releasably connectable to each other so that in one operating mode they are integrated together and in second operating mode they are separate entities.

In an embodiment, after hashing, either the trusted domain circle node 125 or the gateway node 120 is configured to record the cryptographic hash block associated with a digital signature to a block of a blockchain 170.

In an embodiment, transaction data may be encrypted before hashing. For example, asymmetrical encrypting of the data may be carried out by the trusted node 110-130. The encrypted data may be stored to at least one node. In case the system comprises a gateway node 120, it may be beneficial to store most of the trusted circle related data within the gateway node 120 due to it is easier to arrange larger memory and storing capacity within the gateway node 120 than within the trusted node 125.

An owner of a node 120 may have many nodes (as for instance could be the case in IoT or in household).

The local short-range communication interface (within trusted domain circle 140, for example) may comprise wired or wireless interface. The wide area communication interface may comprise a public network 150, such as Internet.

In an embodiment, the wired interface comprises, for example, at least one of the following: an Ethernet, a Universal Serial Bus (USB); and a High-Definition Multimedia Interface (HDMI). The wireless interface comprises, for example, at least one of the following: a Bluetooth™ network; a Radio Frequency Identification (RF-ID) network; a near field communication (NFC) network; a wireless local area network; and an IEEE 802.11 network.

In an embodiment, a communication interface module of at least one of the nodes 110-130 may comprise location modules for tracking location information of the node. Such location modules may comprise a module for providing a connection to satellite based global positioning system (e.g. GPS), a module for cellular based positioning system, a module for indoor positioning, a module for wireless non-cellular positioning system (e.g. Wi-Fi) or a module for hybrid positioning system, for example.

In an embodiment, the system 100 comprises a server apparatus 110,130, which comprises a storage device for example for storing and providing user data, service data and subscriber information, over data connection to the network 150. The service data may comprise configuration data, account creation data, transaction data of the nodes, and digital blockchain data, for example.

In an embodiment, a proprietary application in the node 120,125 may be a client application of a service whose server application is running on the server apparatus 110,130 of the system 100. The proprietary application may capture or process transaction data for the service and provide the transaction data hashing, blockchain recording and transceiving for the service. In an embodiment, information from the node 120,125 to the network 150 and/or the server 110,130 may be transceived via the connections automatically. Thus the user of the nodes 120,125 may not need to do any control for the service. The domain system server 130 may also maintain account creation process details for the service, such as attaching new nodes to the system 140 as well as maintaining authorized users and devices. Client node 120,125 may not need blockchain implementation and blockchain storage at all.

In an embodiment, history data of earlier transaction data, user profiles, settings, agreements, smart contracts, and blockchains may be maintained at the server 130, for example.

The server 110,130 may also provide a cloud service for the data of devices 110-130. Optionally, further devices may be added, such as peripheral devices for maintaining, providing or processing node data and communication devices for connecting the peripheral devices to the system 100.

The node 125 may operate as a sensor, such as a biometric sensor.

The node 125 may also be applied to human skin or body.

The node 125 may comprise an Internet-of-Things (IoT) device.

The node 110-130 may comprise a user interface or alternatively may not comprise user interface at all but instead the node is remotely operated via another trusted node. The node 110-130 is capable of locally executing software program code. The software program code may be a client application, such as an electronic wallet application, or a client application of a service whose server application is running on a server 110,130 of the system 100.

Embodiments of this invention describe how to implement a system 100 where the website/domain name, IP address, public key, and certificate information are recorded in the blockchain 170. For the owner of a domain, a domain purchase (registration) process combines both registration and security certificate purchasing.

Embodiments may use an open distributed ledger to keep a record of hashes of encrypted user data. The data may be encrypted asymmetrically such that anyone can redo the encryption of the raw data. After encryption the data is hashed and the result is added onto a ledger. A secure de-centralized domain name system (DNS) service illustrated as a trusted circle 140 for all nodes 110-130 can be created and blockchain data shared and/or divided between the nodes within the secure and trusted circle 140.

The blockchain 170 is secure and only approved nodes 110-130 are allowed to access it. All devices 110,130 are nodes of the blockchain 170 and all sensitive information recorded in the blockchain 170 may be synchronized in real-time or whenever a node 110,130 is turned on, for example. Client nodes 120,125 may utilize services provided by the blockchain 170 but do not necessarily need to be recorded within the blockchain 170.

Furthermore, the blockchain 170 may keep track of all devices within the network and provide comprehensive information about their rights over the blockchain network and for sensitive information stored in the blockchain 170. Changes of devices 110-130 and their rights over the blockchain network will need to be approved by the distributed consensus protocol, for example.

A distributed consensus protocol may be used to manage the access rights to the blockchain 170 information. Any adding/deleting devices/nodes 110-130 and handling of highly sensitive information will require approval from other nodes 110-130 through a distributed consensus protocol and a new block will be created correspondingly.

New blocks can be added based on a majority vote of the nodes 110-130, for example.

Figure 2:
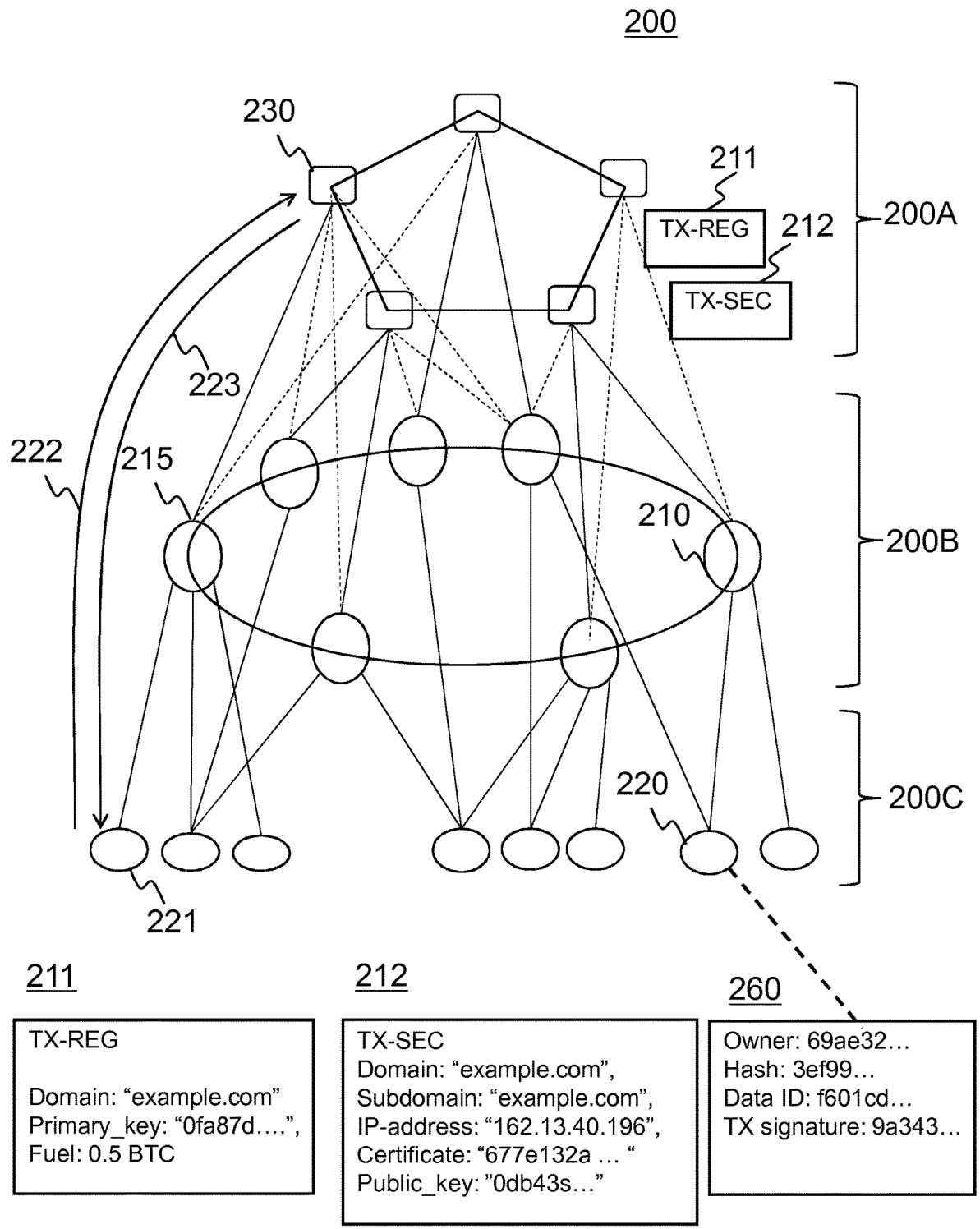
FIG. 2 shows another schematic drawing of a system of an example embodiment.

FIG. 2 shows another schematic drawing of a system of an example embodiment.

A secure de-centralized domain name system 200 utilizing a blockchain comprises a plurality of trusted nodes 210, 220, 230. The data may be shared and/or divided between the nodes 210,220,230 in various ways. The data may comprise blockchain data and associated data.

In an embodiment, a blockchain of the secure decentralized domain name system 200 is configured to be accessed and maintained by a plurality of node layers 200A, 200B, 200C comprising peers of the P2P network that have different roles.

In an embodiment, a plurality of blockchain node layers 200A, 200B, 200C comprise, for example, a domain name node layer 200A, a server node layer 200B, and a client node layer 200C.

In an embodiment, a single blockchain keeps track of both registered domain names and server nodes to form a plurality of blockchain node layers 200A, 200B, 200C. Thus different blockchain node layers correspond to different roles within the system 200 and the DNS usage rather than separate blockchains.

The domain name node layer 200A comprises at least one domain name node 230 configured to control the domain name system and the domain certificate information of the server nodes 210.

The server node layer 200B comprises at least one server node 210 configured to register with the domain name node layer 200A. The server node 210 may also comprise a plurality of servers delivering one site, for example.

The client node layer 200C comprises at least one client node 220 configured to query and respond with the domain name node layer 200A for utilizing secure communication with the server node layer 200B. The client node 220 may comprise a browser application, for example.

In an embodiment, the client node 220 may comprise at least one of the following devices:
an industrial machine;
a sensor;
a personal computer;
a smartphone;
an Internet of Things (IoT) device.
a Personal Digital Assistant (PDA);
an Internet tablet;
a network attached storage (NAS); and
a user device.

In order to register a domain for a host server 210, a cryptocurrency protocol and a variation of micropayments may be utilized. Bitcoin (BTC) may be used as an example currency, but any currency tied to the real world such as EURs, USD or the like may be used. Registration of a domain for the server node 210 is configured to be done by creating a transaction 211 to the blockchain that contains the domain name, public key of the intended domain maintainer and a payment information that serves to pay a continuous fee (which can take a form of micropayment) of running the Domain Name System (DNS) network, for example.

In an embodiment, the transaction 211 may comprise for example following information:

```
{
Domain: "example.com"
Primary_key: "0fa87d...."‚
Deposit information: "Deposit account" / 0.5 BTC
}
```

An amount of fee may be taken from a deposit account owned by the person or organization signing the transaction 211. At every block (or every nth block) an amount of the fee is withdrawn from the domain registration and is deposited to the miners of the blockchain network. The fee may serve at least two purposes: 1) making it expensive to hijack domains, and 2) give an incentive to run Domain Name System (DNS) nodes.

In an embodiment, deposit information may define a deposit account or virtual wallet from which money is continuously drawn and distributed to the maintaining nodes.

In an embodiment, a cancellation transaction may be defined to allow the owner to recover the remainder of the deposit.

In an embodiment, a conducting a virtual currency transaction, such as the transaction 211, may comprise steps of: a payer providing account information that may correspond to a virtual wallet having cryptocurrencies, for example; a payee receiving a predetermined amount (fee) of cryptocurrencies from said virtual wallet; and said payee depositing the cryptocurrencies into payee's virtual wallet.

In an untrusted environment (i.e. unpermissioned ledger), one or more of the Domain Name System (DNS) nodes 210-220 may have dishonest intentions and try to hijack domains in order to resell at a higher value, for example. The way a node could try to hijack another domain would be by continuously listening to the transactions 211 coming in and then change the primary key to its own primary key. Since a block for the transaction 211 has not been forged yet, the network 200 would have difficulty to determine which primary key is the correct owner, and generally, there would be a non-zero probability of stealing a domain upon registration. To circumvent this, an embodiment is configured to use encrypting the transaction 211 with a random number. Once the encrypted transaction 211 has been accepted into the blockchain 200, the random number may be released to the blockchain 200 and the blockchain nodes 210-230 can read and trust the registration transaction 211. In this way one prevents dishonest nodes from listening to the network and quickly acquire domain names when a new registration is issued.

In an embodiment, after approval a domain registration transaction 211 is recorded to the blockchain 200, wherein the domain registration transaction 211 comprising a domain name, a domain primary key and domain certificate information for the server node 210.

After registration of a domain for a server node 210 into Domain Name System (DNS) registry (e.g. to the domain name node 230 or some other blockchain node layer 200A node of the blockchain) and an IP address is assigned, the owner of the server node 210 is able to submit a public key to be included in the Domain Name System (DNS) record together with a security certificate.

A domain security transaction 212 is then recorded for the associated server node 210, comprising a domain public key, to the blockchain 200 to generate a domain name record comprising the domain name, an associated IP address, the domain public key and the domain certificate information, wherein the domain security transaction being signed using the domain primary key.

As an example, the domain security transaction 212 may comprise information of the following form:

```
{
Domain: "example.com",
Subdomain: "example.com",
IP-address: "162.13.40.196",
Certificate: "677e132a ... "
Public_key: "0db43s..."
}
```

The domain security transaction 212 is signed by the server node 210 primary key that was given during registration. In this setup, the functions of domain name registrar and Certificate Authorities are combined. With distributed feature of the blockchain 200, any user can operate his/her own Domain Name System (DNS) server to provide local and/or public Domain Name System (DNS) service by setting up a blockchain node 230.

Like regular transactions in cryptocurrencies, domain address, domain name and domain public key pairs need to get confirmations from other nodes 210-230 during new block generation for the blockchain, and are virtually immune to being altered by a Man-In-the-Middle attack.

The blockchain can be set up based on proof-of-work (PoW) or Proof-of-Stake (PoS) principle, for example, and the ledger may be either permissioned or unpermissioned. In the case of a permissioned ledger, the consensus algorithm may use such mechanisms as majority voting or a Byzantine fault-tolerant consensus algorithm, for example.

In an embodiment, the Domain Name System (DNS) based blockchain system 200 is running on a permissioned chain. In such case, new Domain Name System (DNS) blockchain nodes 210-230 may be added by means of majority voting. To this end the ledger contains a record with certified Domain Name System (DNS) node public keys. These keys may be used as a certificate for the Domain Name System (DNS) service itself and client node 220 browsers may in this case require a cryptographic proof-of-identity from the Domain Name System (DNS) service.

In an embodiment, after the server node 210 related registration and certification transactions 211, 212 are validated and associated domain information updated to the domain name record in the blockchain system 200, secure communication between the server node 210 and the client node 220 is enabled.

Regardless of whether the blockchain system 200 is permissioned or permissionless, when a client node 220 browser visits a website of the server node 210, the browser first queries the domain name node 230 of the Domain Name System (DNS) blockchain system 200 (can be any server node within the layer 200A) for desired domain's address and security information. The domain name node 230 will respond with domain's address information and also associated security information, including the domain's public key and a resource location, such as an IP address.

In an embodiment, a client node 221 is about to start secure communication with a server node 215. The client node 221 transmits a domain name request 222 to a domain name node 230 relating to the server node 215. The domain name request 222 may comprise at least one of the following: a domain name and an IP address associated with the domain name of the server node 215. In response to the received domain name request 222, the domain name node 230 transmits, to the client node 221, a domain name response 223. The domain name response 223 comprises the domain public key, the domain certificate information and the associated IP address retrieved from the domain name record of the blockchain system 200. After that a secure communication between the client node 221 and the server node 215 may be initiated using at least one of the domain public key and the domain certificate information.

Secure de-centralized domain name system related information of a server node 210 as trusted node within the blockchain 170 may be transceived using blockchain transactions.

In an embodiment, trusted nodes may belong to at least one of the plurality of blockchain node layers 200A, 200B, 200C.

Facilitation of verification and authentication of transactions of the nodes of the trusted domain system may be carried out according to the terms of the pre-defined settings of the blockchain 170. The pre-defined settings may comprise at least one of an agreement and a smart contract of the trusted domain system.

In an embodiment, nodes 210, 215, 220-221 (i.e. node layers 200B and 200C) may or may not have blockchains running on their systems and/or blockchain data maintained within their systems.

In an embodiment, the blockchain 170 data may be divided between nodes 210,215,220-221,230 of the trusted domain system 200 using a self-balancing binary search tree, such as an AVL tree or a Patricia tree.

In an embodiment, an AVL tree is used. Such implementation may occasionally require large amount of data to be transceived between the nodes and should only be used when this is possible. In other cases it may be more feasible to use a Patricia tree (also known as a Radix tree). This particular choice of abstract data type makes it easy to route the data updates to the correct node and does not have overhead due to data exchange upon insertion/deletion.

At the time where a proof-of-work should be found, the nodes 210,215,220-221,230 may combine the hashes from the transactions to form a Merkle tree, or simply keep a hash of the state of the full storage system, which will enter the next block. In some implementations it may be feasible to do both as this allows to implement a fast-forward mechanism that makes new nodes catch up with the network in much less time than what they would need if only the Merkle hash of the transactions are stored in the blocks.

In addition to distributing the storage, the nodes 210,215, 220-221,230 may also distribute hash power. This may happen within a trusted circle and it may be done across subsets of the networks by making pools, for example. Unlike the storage, distribution of the hash power does not require trust and can therefore easily be implemented in many various scenarios.

It is worth noting that nodes 210,215,220-221,230 in the trusted domain name system 200 may not be equal in computational power and/or storage capacity. Nodes may also fulfill different roles and/or additional roles to their blockchain capabilities. For instance, in one scenario one node may act as a gateway (or router). In an IoT setting, such gateway node may store most of the blockchain while the remaining nodes are fairly low-power and low capacity devices that only store small parts of the blockchain. Within this scenario, the gateway may ensure that new nodes are unable to communicate with the outside world until being accepted as part of a cluster.

In an embodiment, imbalanced situations may also be covered, wherein first node related blockchain data is maintained by a second node together with the second node related blockchain data.

Since this protocol has small clusters of nodes sharing storage one obtains a higher level of stability in comparison with building a fully distributed storage as a feature of the ledger. For instance, it is well known that AVL lookup tables are likely to break down once scaled to a large enough size. Making clusters for different users gives incentive for every user to keep a full record of the chain since they cannot earn rewards without it and that's a crucial difference to a more general scheme where a user can earn incentives even without a full record.

In an embodiment, each node 210,215,220-221,230 of the trusted domain system 200 may maintain information of other trusted nodes 210,215,220-221,230 of the trusted domain system 200. The information of other trusted nodes may comprise a public key of each trusted node. The information of other trusted nodes may also comprise a node identifier of a trusted node such as MAC (Media Access Control) address.

In an embodiment, a node identifier is assigned to each node 210,215,220-221,230 of the trusted domain system 200, wherein the node identifier may comprise a public key.

Furthermore, a trusted domain system identifier may be assigned to the trusted domain system 200. Routing transactions from nodes external to the trusted domain system 200 may base on the trusted circle identifier.

The transaction data may be stored at a node 210,215, 220-221,230 that adds a hash of an asymmetric encryption on to generate a hash block 260. In some embodiments, the data may be stored directly on the node 210,215,220-221, 230.

The hash block 260 of the asymmetrically encrypted data may be computed and added to the blockchain 170. Based on agreed settings, the hash block is added for example to a portion of the blockchain 170 that is maintained by a node 210,215,220-221,230 responsible for the particular transaction data, the hash block 260 and associated data. The blockchain 170 may be protected by a proof algorithm, such as proof-of-work, proof-of-stake or the like. The user can now at any time decrypt the data and send it to another node within a network system 200 (in practice this may be automated, and the user/administrator simply chooses which nodes may access which types of data on a continuous basis).

Any trusted node may then verify that this was indeed the original data that was collected by the node 210,215,220-221,230, by first asymmetrically encrypting it, computing the hash and verifying its presence in the blockchain. Nodes 210,215,220-221,230 may be nodes in a network of nodes, such as a network for Internet of Things (IoT).

In an embodiment, the blockchain may implemented using Merkle trees. Aggregating hash values of the exchanged data in a Merkle tree is efficient, since the "root" 230 of the Merkle tree may provide a compressed digest of all individual hash values, so that the Merkle tree reduces storage requirements.

A distributed ledger is a database that can securely record user transaction data for sharing across a network through entirely transparent updates of information.

The blockchain data structure is an ordered, back-linked list of blocks of transactions. The blockchain can be stored as a flat file, or in a simple database. Blocks 260 are linked "back" each referring to the previous block in the chain. The blockchain is often visualized as a stack, with blocks layered on top or next of each other and the first block serving as the foundation of the stack. The visualization of blocks stacked on top of each other results in the use of terms such as "height" to refer to the distance from the first block, and "top" or "tip" to refer to the most recently added block.

In an embodiment, one may want to store the data unencrypted in which case the asymmetric encryption can be omitted in both cases. In some embodiments the transaction data may be encrypted and hashed by the node 210,215, 220-221,230 itself and only accepted onto the ledger if a node public key is verified as a certified device.

In an embodiment, a server node, Internet of Things (IoT) device, or a client node, may comprise a private key for asymmetric cryptography. The asymmetric cryptographic system uses pairs of keys: public keys that may be disseminated widely paired with private keys, which are known only to the owner. There are two functions that can be achieved: using a public key to authenticate that a message originated with a holder of the paired private key; and/or encrypting a message with a public key to ensure that only the holder of the paired private key can decrypt it.

The private key may be configured to the node 210,215, 220-221,230 by the manufacturer or re-seller of the node 210,215,220-221,230 or generated by the node 210,215,220-221,230. Then, when joining a trusted domain system 200, the node 210,215,220-221,230 may update its public key to other nodes 210,215,220-221,230. Alternatively, a node 210,215,220-221,230 may receive a private key from other trusted node 210,215,220-221,230 when joining the trusted domain system 200 and the corresponding public key made available.

In an embodiment, a device receives transaction data from a node 210,215,220-221,230. The device hashes the transaction data using a cryptographic hashing function, to create a cryptographic hash block, and fetches a reference cryptographic hash block from the blockchain 170. The device may then compare the cryptographic hash block to the fetched block from the blockchain 170. The transaction data may be verified in response to finding a matching cryptographic hash block in the blockchain 170 based on the comparing step.

Figure 3A:
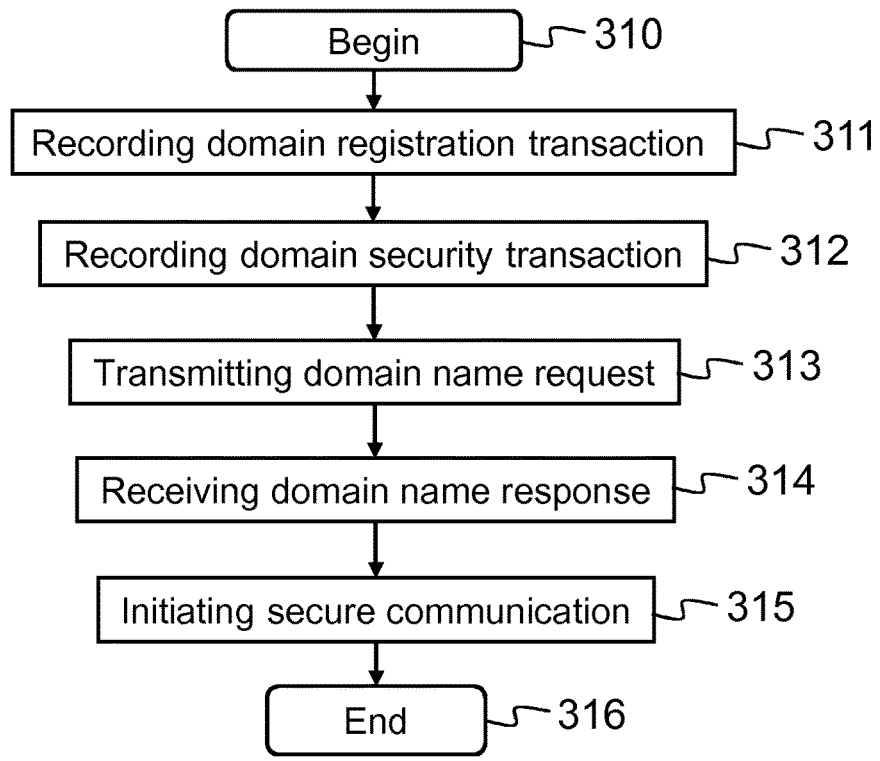
FIGS. 3a-3d show flow diagrams illustrating methods according to example embodiments of the invention.

FIG. 3a shows a flow diagram illustrating a computer-implemented method for secure de-centralized domain name system according to a first embodiment. The method begins at step 310. In step 311, a domain registration transaction is recorded to a blockchain, the domain registration transaction comprising a domain name, a domain primary key and domain certificate information for a server node. In step 312, a domain security transaction comprising a domain public key is recorded to the blockchain to generate a domain name record comprising the domain name, an associated IP address, the domain public key and the domain certificate information, wherein the domain security transaction being signed using the domain primary key. In step 313, a domain name request is transmitted, by a client node, to a domain name node. In step 314, a domain name response is received, by the client node, from the domain name node, the domain name response comprising the domain public key, the domain certificate information and the associated IP address retrieved from the domain name record of the blockchain. In step 315, a secure communication is initiated between the client node and the server node using at least one of the domain public key and the domain certificate information. In step 316, the method ends.

Figure 3B:
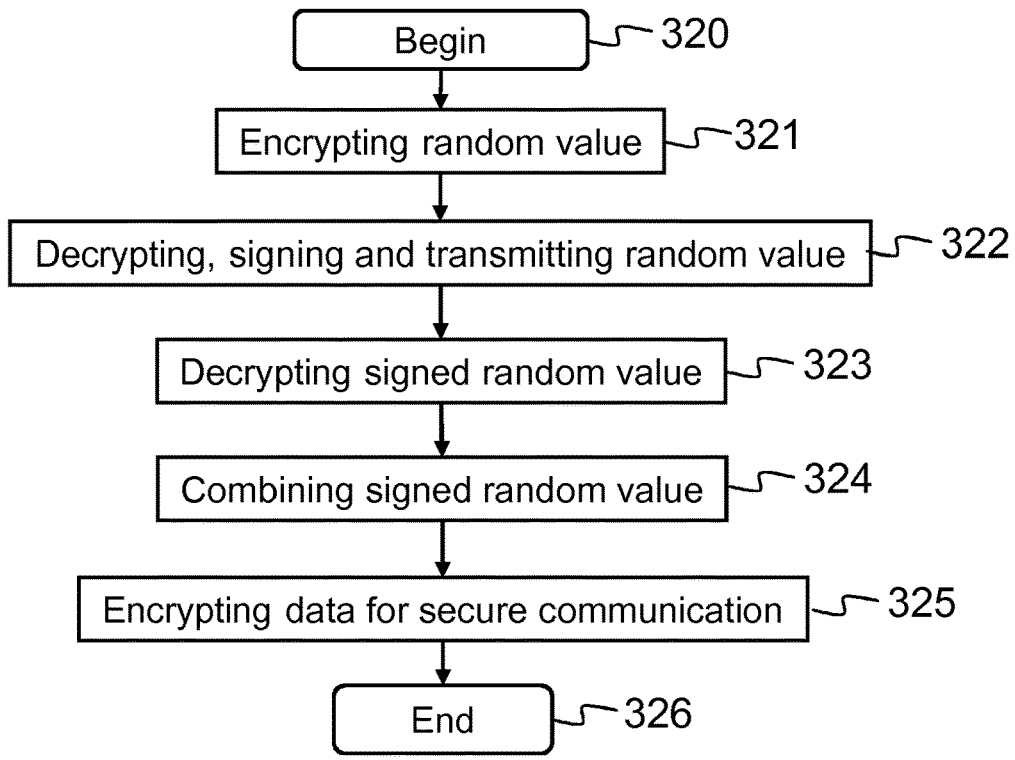

FIG. 3b shows a flow diagram illustrating a computer-implemented method for secure de-centralized domain name system according to a second embodiment. The method begins at step 320. In step 321, the client node encrypts a random value using a shared secret and transmits the encrypted random value to the server node. In step 322, the server node decrypts the received encrypted random value and signs the decrypted random value using a private key of the server node, encrypts the signed random value using the shared secret and transmits the encrypted signed random value to the client node. In step 323, the client node decrypts the encrypted signed random value using the shared secret to generate the signed random value. In step 324, the client node combines the signed random value with the domain public key of the server node to verify the server node. In step 325, the random value is utilized for encrypting data of the secure communication between the client node and the server node. In step 326, the method ends.

In an embodiment, a browser application of the client device computes a shared secret using, for instance, the Diffie-Hellman algorithm. The browser or some other application of the client device then encrypts a random number and sends it, possibly together with the client's public key, to the server node located at the resource location specified by the blockchain domain name node.

The host web server decrypts the message, signs the random number, encrypts it with the shared secret and sends it back to the client node.

The client then verifies that the secret is signed with the correct private key by comparing to the information obtained from the blockchain domain name node.

The random number is thereafter used for further encryption using such encryption methods as AES, DES or similar, for example.

Figure 3C:
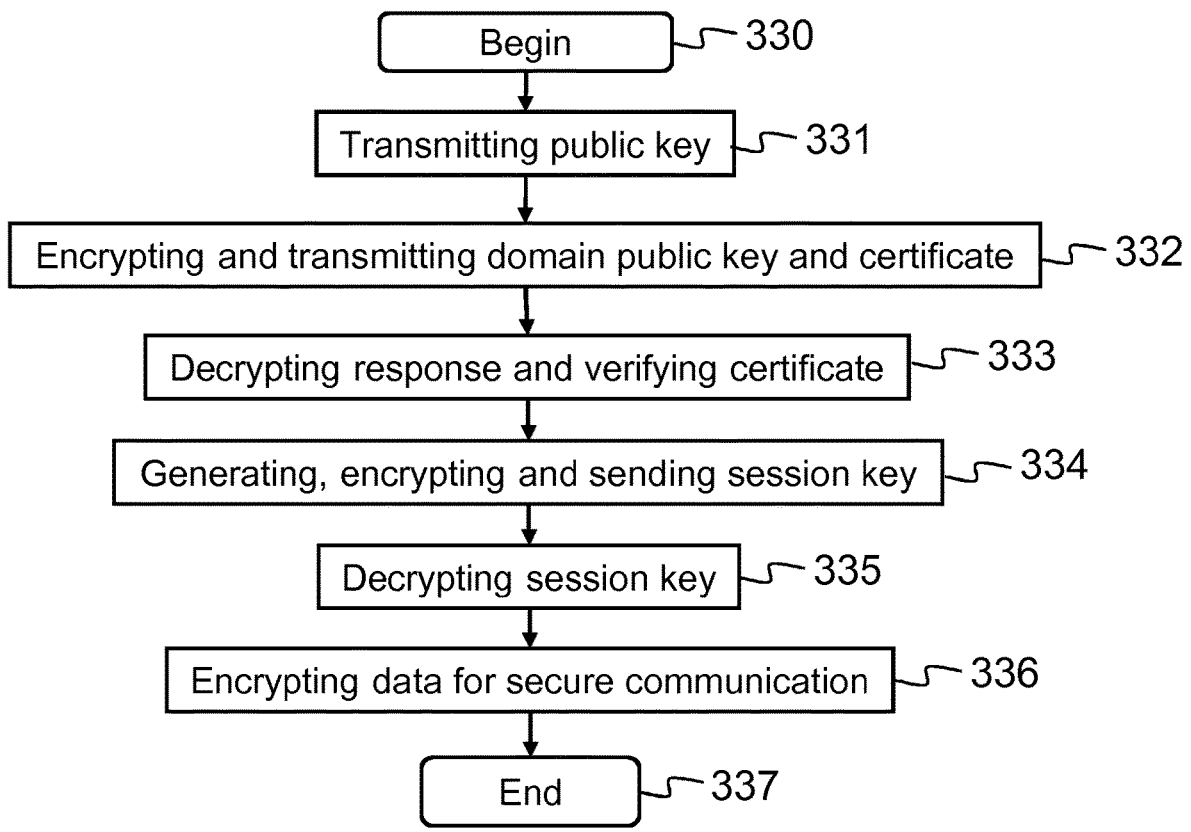

FIG. 3c shows a flow diagram illustrating a computer-implemented method for secure de-centralized domain name system according to a third embodiment. The method begins at step 330. In step 331, the client node transmits a public key of the client node to the server node. In step 332, the server node encrypts the domain public key and the domain certificate information using the public key of the client node to provide encrypted response, and transmits the encrypted response to the client node. In step 333, the client node decrypts the encrypted response using a private key of the client node to generate the domain public key and the domain certificate information, and compares the generated domain certificate information to the domain certificate information received from the domain name node to verify the server node. In step 334, the client node generates a session key in response to verifying the server node, encrypts the session key using the domain public key, and transmits the encrypted session key to the server node. In step 335, the server node decrypts the encrypted session key using a domain private key. In step 336, the session key is utilized for encrypting data of the secure communication between the client node and the server node. In step 337, the method ends.

In an embodiment, the security protocol can be realized as a modified version of HTTPS protocol.

The browser connects with the host web server with address information and requests for a secure session. The browser will provide its public key to the server in this step.

The host web server responds by sending over its public key and the security certificate issued by the blockchain name server, encrypted by the browser's public key.

The browser then checks if the certificate is valid or not by comparing it with the one obtained from name server earlier. After verification, the browser sends a one-time session key encrypted with the web server's public key.

The host web server decrypts the one-time session key with its private key and from here on secure communication can be performed between the browser and the host web server by using the one-time session key.

In an embodiment, just one public key (the public key from domain name node of the blockchain) may be used for the secure communication. However, any other key generation methods/protocols can be implemented instead of above proposed embodiments or added on top of them.

Furthermore, any kind of previous trusting problems that could be caused by using a single CA is not a problem anymore since any changes made to the existing domain names and their associated certificates will be verified by the multiple blockchain nodes on the ledger.

Figure 3D:
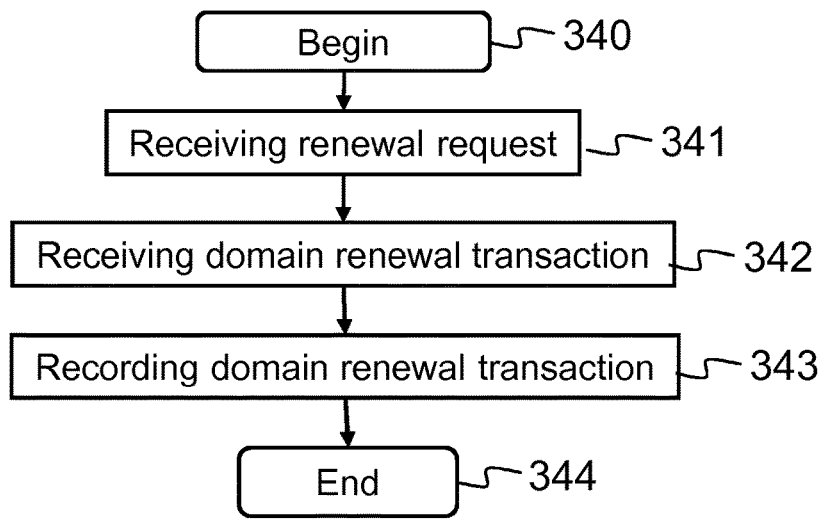

FIG. 3d shows a flow diagram illustrating a computer-implemented method for secure de-centralized domain name system according to a fourth embodiment. The method begins at step 340. In step 341, a renewal request is received for the domain name record of the blockchain. In step 342, a domain renewal transaction comprising update to the domain name record is received. In step 343, the domain renewal transaction is recorded in response to the transaction being confirmed into the blockchain according to a security protocol of the de-centralized domain name system. In step 344, the method ends.

In an embodiment, ownership of websites/domains may be based on periodical renew policy. Any website/domain ceased to use or abandoned may be recorded to the blockchain. The domain name and its public key pairs can also be renewed manually. If a website/domain have lost its private key, the administrator of the domain can also raise a request to the blockchain to renew its key pairs separately. In response to similar verification voting steps from multiple nodes, a new public key can be validated, for example.

In some embodiments, the Domain Name System (DNS) blockchain name server system may be used for a certain level of domain addresses, for example only for top level and second level of the Internet. In that case, the security certificate a domain obtained during registration may work as a root certificate. Any other pages under the same domain will be considered as trusted at the same level once signed by this root certificate.

In some embodiments, the Domain Name System (DNS) blockchain name server may include different levels of nodes, such as top-level administration nodes and general sub-level nodes, for example. In such case, top level administration nodes may be responsible for the top level (and second level) domain registration and sub-level nodes can be any domain that wish to run it is own Domain Name System (DNS) name service as well as issue security certificates for its own webpages, for example.

In some embodiments, a company (or multiple companies) can deploy its own blockchain domain name system for internal usage.

Furthermore, it may be possible to trade domain names for cash as well as for currency maintainers. The latter would be necessary if the blockchain currency is linked to a fiat currency, for example.

Figure 4:
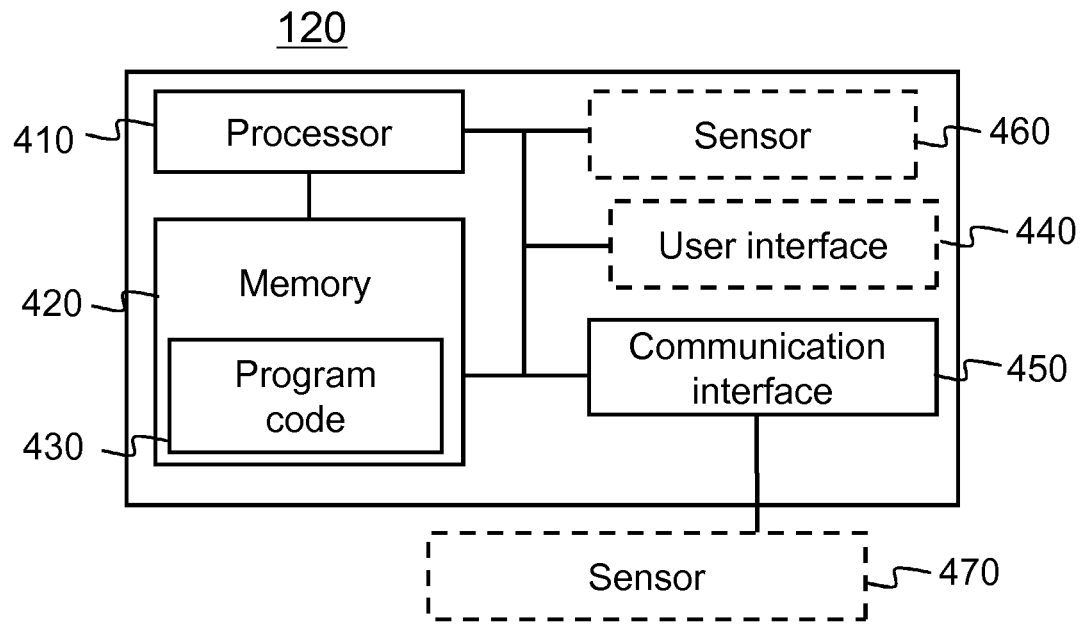
FIG. 4 shows a block diagram of a device of an example embodiment.

FIG. 4 presents an example block diagram of a node or a device 120 in which various embodiments of the invention may be applied. The device may be a computer device, a smart device, a user device, a user wearable device, a sensor device or a hub device, for example. All elements described in FIG. 4 are not necessary to be implemented in the same device.

In an embodiment, a sensor 470 may be implemented as a separate device (e.g. a user wearable device) communicating via the communication interface 450 with other device, or as an integrated sensor 460 within the device. The user interface 440 may be implemented also in another device connected via a communication interface 450 to the device 120. Such device may comprise a mobile phone, a smart phone, or a tablet, for example. In an embodiment, the device 120 may communicate with a plurality of sensors 460, 470, both internal and external sensors, and of a plurality of users. The sensor 460, 470 may be used as biometric sensor to identify the user of the device, using for example, fingerprint detection or retina detection.

The general structure of the device 120 comprises a user interface 440, a communication interface 450, a processor 410, and a memory 420 coupled to the processor 410. The device 120 further comprises software 430 stored in the memory 420 and operable to be loaded into and executed in the processor 410. The software 430 may comprise one or more software modules and can be in the form of a computer program product. Not all elements of FIG. 4 are necessary but optional for the device 120 such as the user interface 440 and sensors 460, 470.

The processor 410 may be, e.g., a central processing unit (CPU), a microprocessor, a digital signal processor (DSP), a graphics processing unit, or the like. FIG. 4 shows one processor 410, but the device 120 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The device 120 may comprise a plurality of memories. The memory 420 may be constructed as a part of the device 120 or it may be inserted into a slot, port, or the like of the device 120 by a user. The memory 420 may serve the sole purpose of storing data, or it may be constructed as a part of an apparatus serving other purposes, such as processing data.

The user interface 440 may comprise circuitry for receiving input from a user of the device 120, e.g., via a keyboard, a touchpad, a motion sensor, a touch-screen of the device 120 speech recognition circuitry, gesture recognition circuitry or an accessory device, such as a headset or a remote controller, for example. Furthermore, the user interface 440 may comprise circuitry for providing output for the user via a display, a speaker, a touch-sensitive display or a tactile feedback device, for example.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, Long Term Evolution (LTE), 5G or any appropriate future radio technology radio module. The wired interface may comprise such as Ethernet, universal serial bus (USB), High Definition Multimedia Interface (HDMI), Syndicat des Constructeurs' Appareils Radiorécepteurs et Téléviseurs (SCART) or Radio Corporation of American (RCA), for example. The communication interface module 450 may be integrated into the device 120 or into an adapter, card or the like that may be inserted into a suitable slot or port of the device 120. The communication interface module 450 may support one radio interface technology or a plurality of technologies. The communication interface module 450 may support one wired interface technology or a plurality of technologies. The device 120 may comprise a plurality of communication interface modules 450.

In an embodiment, the communication interface module 450 may comprise location modules for tracking location of the device 120. Such location modules may comprise a module for satellite based global positioning system (e.g. GPS), a module for cellular based positioning system, a module for wireless non-cellular positioning system (e.g. Wi-Fi) or a module for hybrid positioning system, for example.

A skilled person appreciates that in addition to the elements shown in FIG. 4, the device 120 may comprise other elements, such as microphones, speakers, sensors, cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the device 120 may comprise a disposable or rechargeable battery (not shown) for powering when external power if external power supply is not available.

In an embodiment, the device 120 comprises an additional sensor 460, 470 for providing metadata associated to the transaction data (e.g. biometric information). The metadata may comprise at least one of the following: fingerprint information; retinal scan information; movement information; and location information.

In an embodiment, the device 120 comprises speech or gesture recognition means. Using these means, a pre-defined phrase or a gesture may be recognized from the speech or the gesture and translated into control information for the device 120.

User wearable devices and sensors thereof provided in various embodiments may be used for example in fingerprint detection and retinal scan detection, for example.

Figure 5:
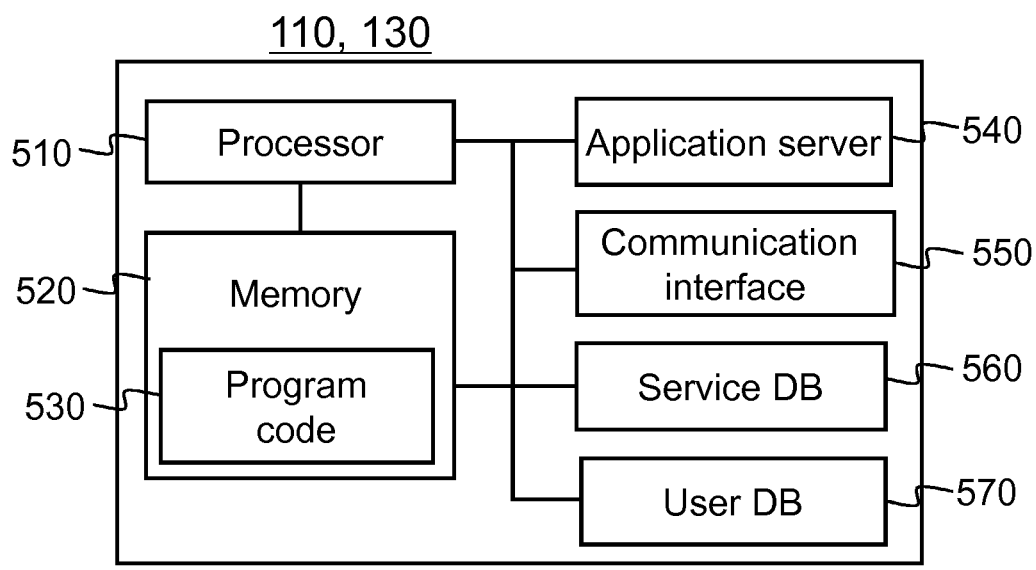
FIG. 5 shows a block diagram of a server apparatus of an example embodiment.

FIG. 5 shows a block diagram of a server apparatus 110, 130 of an example embodiment.

The general structure of the server apparatus 110, 130 comprises a processor 510, and a memory 520 coupled to the processor 510. The server apparatus 110, 130 further comprises software 530 stored in the memory 520 and operable to be loaded into and executed in the processor 510. The software 530 may comprise one or more software modules and can be in the form of a computer program product.

The processor 510 may be, e.g., a central processing unit (CPU), a microprocessor, a digital signal processor (DSP), a graphics processing unit, or the like. FIG. 5 shows one processor 510, but the server apparatus 110, 130 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 110, 130 may comprise a plurality of memories. The memory 520 may be constructed as a part of the server apparatus 110, 130 or it may be inserted into a slot, port, or the like of the server apparatus 110, 130 by a user. The memory 520 may serve the sole purpose of storing data, or it may be constructed as a part of an apparatus serving other purposes, such as processing data.

The communication interface module 550 implements at least part of data transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, Long Term Evolution (LTE), 5G or any appropriate future radio technology radio module. The wired interface may comprise such as Ethernet or universal serial bus (USB), for example. The communication interface module 550 may be integrated into the server apparatus 110, 130, or into an adapter, card or the like that may be inserted into a suitable slot or port of the server apparatus 110, 130. The communication interface module 550 may support one radio interface technology or a plurality of technologies. Registration, certificate and secure communication related information between the nodes 120 and the system servers 110, 130 may be transceived using the communication interface 550.

An application server 540 provides application services e.g. relating to the domain names and associated security information stored in a user database 570 and to the service information stored in a service database 560. The service information may comprise content information, content management information or metrics information, for example. The service information may also comprise information relating to transaction data, history data of earlier transaction data, or blockchains, for example.

A skilled person appreciates that in addition to the elements shown in FIG. 5, the server apparatus 110, 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

In an embodiment, a trusted circle for a domain name system may be initially setup by any trusted node within the system according to pre-defined settings. Hashing and encrypting may be balanced for nodes having better processing power, security, memory capacity and/or powering. Hashing and encryption may also be user changeable based on the user settings or based on the local system administrator, for example.

Figure 6:
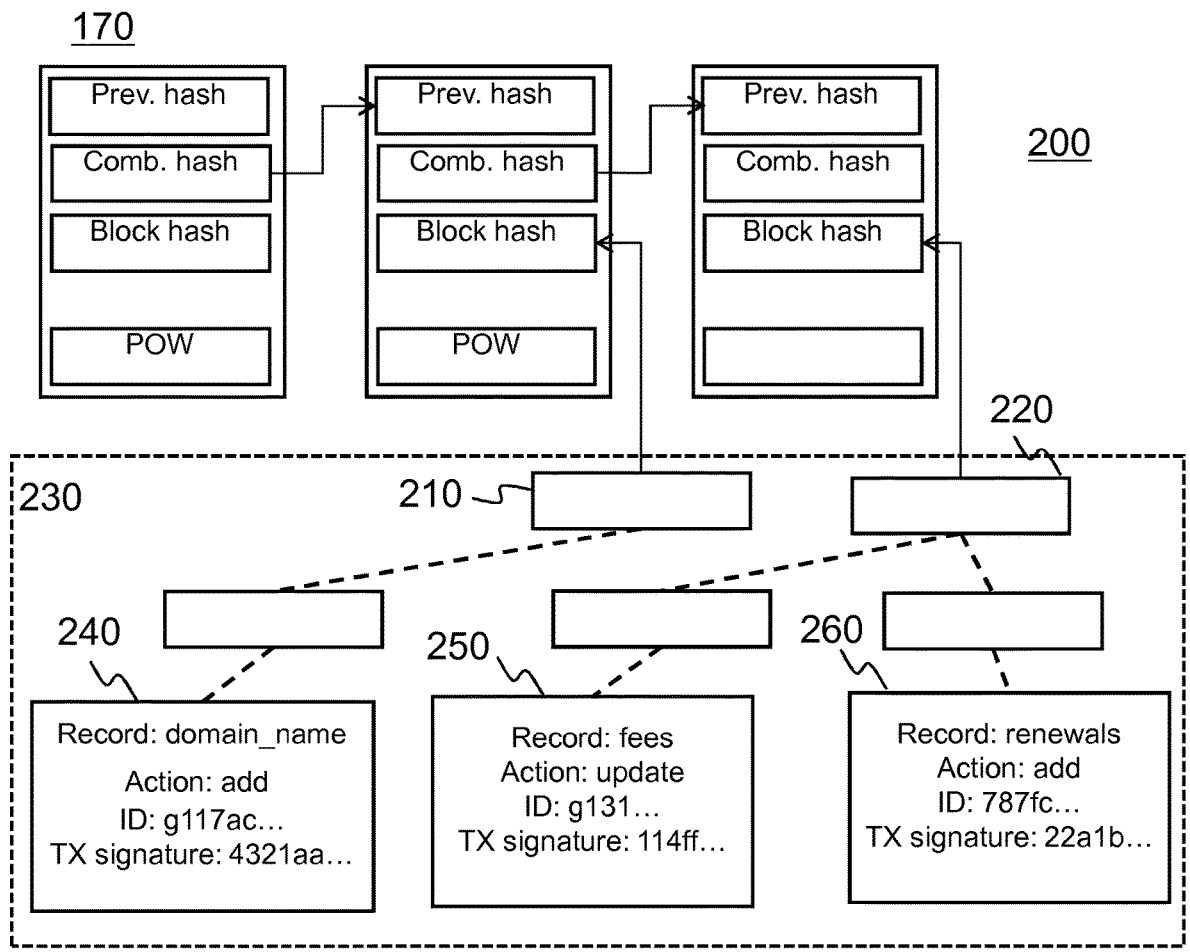
FIG. 6 shows another schematic drawing of a system of an example embodiment.

FIG. 6 shows another schematic drawing of a system 200 of an example embodiment.

In an embodiment, although a block has just one parent, it can temporarily have multiple children. Each of the children refers to the same block as its parent and contains the same (parent) hash in the "previous block hash" field. Eventually, only one child block becomes part of the private blockchain 170. Even though a block may have more than one child, each block can have only one parent. This is because a block has one single "previous block hash" field referencing its single parent.

In an embodiment, each block within the blockchain 170 may be identified by a hash, generated using a cryptographic hash algorithm (e.g. SHA256) on the header of the block. Each block also references a previous block, known as the parent block, through the "previous block hash" field in the block header. In other words, each block contains the hash of its parent inside its own header. The sequence of hashes linking each block to its parent creates a chain going back all the way to the first block ever created, known as the genesis block.

In an embodiment, each block in the blockchain 170 may contain a summary of all the transactions in the block, using a Merkle tree. The Merkle tree, also known as a binary hash tree, is a data structure used for efficiently summarizing and verifying the integrity of large sets of data. Merkle trees are binary trees containing cryptographic hashes. The term "tree" is used in computer science to describe a branching data structure, but these trees are usually displayed upside down with the "root" at the top and the "leaves" at the bottom of a diagram.

In an embodiment, the Merkle tree is omitted and blocks of "transactions" are linked directly together in the blockchain 170.

The digital blockchain 170 corresponds to a distributed cryptographic ledger shared amongst all trusted nodes participating in the trusted domain system 200, over which every successfully performed transaction is recorded.

In an embodiment, a block 210 is processed by combining previous block information (e.g., a hash of a block header) from a blockchain 170 with additional information, thereby linking the block 210 with the blockchain 170. The additional transaction information can include time stamp, device information of the trusted domain system, transaction history, login information, passwords, user specified sensitive data, a token and/or a digital signature, for example. Another trusted node can re-calculate a value for the block, typically a hash of the block's header along with hash information from the transactions, until the resulting value satisfies the validity requirement. For example, in embodiments where block 210 is processed via a hash function (e.g., SHA256, Scrypt, etc.), the other trusted node can increment a nonce value until a hash is generated having the desired proof-of-work characteristics, perhaps a number of leading zero bits among other factors, for example.

In an embodiment, a previous block 210 and a current block 220 are illustrated in FIG. 6, and illustrating how combined hash of the previous block 210 is used for generation of current block 220 in the blockchain 170.

In one embodiment, a pair of public and secret key pairs may be generated at each node/device in order to implement a cryptographic digital signature scheme. The public key can be used as the node/device identifier (used in place of a MAC address), whereas the private key is securely stored in the node/device and it does not leave the node. The private key may be stored within a "secure element", such as a separate electronic module with limited input/output with the rest of the node/device, which is capable of performing digital signatures.

In an embodiment, different uses of public-key cryptography may be utilized. To ensure confidentiality, public-key encryption may be used, in which a message is encrypted with a trusted node's public key. The message cannot be decrypted by anyone who does not possess the matching private key, who is thus presumed to be the owner of that key and the person associated with the public key.

To ensure tamper-proof, digital signatures (signing) may be utilized, in which a message is signed with the first trusted node's private key and can be verified by any second trusted node that has access to the first trusted node public key. This verification proves that the first trusted node had access to the private key, and therefore is likely to be the person associated with the public key. This also ensures that the message has not been tampered with, as any manipulation of the message will result in changes to the encoded message digest, which otherwise remains unchanged between the first node (sender) and the second node (receiver).

In an embodiment, FIG. 6 illustrates one alternative solution for generating transaction records. Instead of generating a transaction block comprising all domain name and security related data, a plurality of blocks may be generated for different types of sensitive data. For example, a transaction record 240 may be generated for recording a domain name record comprising the domain name, an associated IP address, the domain public key and the domain certificate information, for example. Further record 250 may be arranged for maintenance fees for domains, and a transaction record 260 for renewals for domains and related fees, for example.

In an embodiment, a new node/device may be added to the trusted domain name system 200 and a new block added to the blockchain 170.

A new node/device of the user can join the blockchain 170 network via following steps, for example. Not all steps are mandatory to carry out the procedure.

First, blockchain management software with suitable user interface may be installed to the node/device (for example, a wallet application).

Second, the new server node/device is connected to other trusted nodes/devices on the blockchain network. This can be done with direct connections like Bluetooth or Wi-Fi or with Internet protocol, for example.

Third, the administrator of the server node may initialize an enquiry about available blockchain 170 and requests to join the trusted domain name system 200.

Fourth, the trusted server nodes/devices already on the blockchain 170 gather necessary information and according to distributed consensus protocol push a request to at least one secure trusted node/device for confirmation. The request may be sent to, for example, a trusted node with biometric sensor to ensure the validity of confirmation. Alternatively, random selection of target node of the higher blockchain node layer, such as domain name node layer, with high security level may be selected.

Fifth, the administrator of the domain name node has to confirm via one of the other nodes/devices to allow the new server node/device to join the network of trusted domain name system and use the blockchain 170.

Sixth, when the distributed consensus protocol received all positive answer(s), the current block is hashed and a new block will be added to the blockchain 170 and synced to all domain name nodes/devices of the trusted system. A notice of new server node/device joining the blockchain 170 network is pushed to desired server nodes/devices of the trusted system.

In an embodiment, changing of node/device properties and removing a node/device may follow similar process disclosed above but may only need approval from one node/device. The level or required security can be set in a distributed consensus protocol and/or user specific settings for the trusted circle.

Furthermore, new blocks may be added to the blockchain 170 to include changing public keys, private keys, certificates, deposit information, fee information, passwords, financial transactions, and user's request of changing certain information, for example.

The distributed consensus protocol can take many different forms, such as, one of the methods below or a combination of them.

A single high-security node of the trusted circle can be picked randomly to decide if the block can be added to the blockchain 170. Such random choice can be effectively implemented by different means like using a random number generator, using a Proof-of-Work protocol, or a Proof-of-Stake protocol.

A majority vote of the high-security nodes establishes if the block can be added to the blockchain 170. This may take multiple confirmations from different nodes/devices, but it is worth doing, for instance, when a high-security node/device requests to join the blockchain 170 network. In such cases, the addition of the new block may pose a security threat and this kind of higher-level security is needed before accepting the block from different nodes/devices.

If a block is requested by a high-security node, it can be immediately added to the blockchain 170. This is quick and convenient, for instance, when noncritical updates is performed and the security threat can be considered low enough for a majority vote not being needed.

In the preferred embodiment, a majority vote between the high-security nodes shall be used since this makes it harder to attack the network in comparison with a single node.

At the time where a proof-of-work (POW) should be found, the nodes may combine the hashes from the transactions to form a Merkle tree 230, or simply keep a hash of the state of the full storage system, which will enter the next block. In some implementations it may be feasible to do both as this allows to implement a fast-forward mechanism that makes new nodes catch up with the network in much less time than what they would need if only the Merkle hash of the transactions are stored in the blocks.

In addition to distributing the storage, the nodes may also distribute hash power. This may happen within a trusted circle and it may be done across subsets of the networks by making pools, for example. Unlike the storage, distribution of the hash power does not necessarily require trust and can therefore easily be implemented in many various scenarios.

In an embodiment, transaction data may be generated by a first node. The transaction data is hashed using a cryptographic hashing function, to create a cryptographic hash block, the cryptographic hash block is associated with a digital signature of the first node and may be transmitted to a blockchain.

In an embodiment, a node identifier is assigned to each node, wherein the node identifier may comprise a public key.

Furthermore, a trusted user circle identifier may be assigned to the trusted circle. Routing transactions from nodes external to the trusted circle may base on the trusted circle identifier.

The transaction data, such as domain name related data item, may be stored at a node that adds a hash of an asymmetric encryption on to generate a hash block 210, 220. In some embodiments, the data may be stored directly on the node.

The hash block 210, 220 of the asymmetrically encrypted data may be computed and added to a blockchain 170. The blockchain 170 may be protected by a proof algorithm, such as proof-of-work, proof-of-stake or the like. The user/node can now at any time decrypt the data and send it to a third party or a peer within a network system 200 (in practice this may be automated, and the user/administrator simply chooses which third parties or peers may access which types of data on a continuous basis).

In an embodiment, the blockchain 170 may be implemented using Merkle trees 230. Aggregating hash values of the exchanged data in a Merkle tree 230 is efficient, since the "root" 210, 220 of the Merkle tree 230 provides a compressed digest of all individual hash values, so that the Merkle tree 230 reduces storage requirements.

A distributed ledger is a database that can securely record user transaction data for sharing across a network through entirely transparent updates of information. The blockchain data structure 170 is an ordered, back-linked list of blocks of transactions. The blockchain 170 can be stored as a flat file, or in a simple database. Blocks 210, 220 are linked "back" each referring to the previous block in the chain. The blockchain 170 is often visualized as a vertical stack, with blocks layered on top of each other and the first block serving as the foundation of the stack. The visualization of blocks stacked on top of each other results in the use of terms such as "height" to refer to the distance from the first block, and "top" or "tip" to refer to the most recently added block.

Although a block has just one parent, it can temporarily have multiple children. Each of the children refers to the same block as its parent and contains the same (parent) hash in the "previous block hash" field. Eventually, only one child block becomes part of the blockchain 170. Even though a block may have more than one child, each block 210, 220 can have only one parent. This is because a block has one single "previous block hash" field referencing its single parent.

Each block within the blockchain 170 may be identified by a hash, generated e.g. using a SHA256 cryptographic hash algorithm on the header of the block. Each block also references a previous block, known as the parent block, through the "previous block hash" field in the block header. In other words, each block contains the hash of its parent inside its own header. The sequence of hashes linking each block to its parent creates a chain going back all the way to the first block ever created, known as the genesis block.

In an embodiment, each block in the blockchain 170 contains a summary of all the transactions in the block, using a Merkle tree 230. The Merkle tree 230, also known as a binary hash tree, is a data structure used for efficiently summarizing and verifying the integrity of large sets of data. Merkle trees are binary trees containing cryptographic hashes. The term "tree" is used in computer science to describe a branching data structure, but these trees are usually displayed upside down with the "root" at the top and the "leaves" at the bottom of a diagram.

In an embodiment, the Merkle tree is omitted and blocks of "transactions" are linked directly together in the private blockchain 170.

The digital blockchain 170 corresponds to a distributed cryptographic ledger shared amongst certified and trusted nodes, over which every successfully performed transaction is recorded.

In an embodiment, one may want to store the data unencrypted in which case the asymmetric encryption can be omitted in both cases. In some embodiments the transaction data may be encrypted and hashed by the node itself and only accepted onto the ledger 230, if a node public key is verified as a certified device.

In an embodiment, each device, including IoT (Internet of Things) devices, or node, may comprise a private key for asymmetric cryptography. The asymmetric cryptographic system uses pairs of keys: public keys that may be disseminated widely paired with private keys, which are known only to the owner. There are two functions that can be achieved: using a public key to authenticate that a sensitive data item or message originated with a holder of the paired private key; or encrypting a message or data item with a public key to ensure that only the holder of the paired private key can decrypt it.

The private key may be configured to the node by the manufacturer or re-seller of the node. Then, when joining e.g. a trusted circle, the node may update its public key to other trusted node(s) of the trusted circle. Alternatively, a node may receive a private key from other node when joining the trusted circle and the corresponding public key made available by the node.

Without in any way limiting the scope, interpretation, or application of the claims appearing below, a technical effect of one or more of the example embodiments disclosed herein is that security of Internet services is improved.

Another technical effect of one or more of the example embodiments disclosed herein is that the distributed feature of blockchain will provide Domain Name System (DNS) service that is immune to Denial of Service (DoS) attack.

Still further technical effect of one or more of the example embodiments disclosed herein is that the secure feature of blockchain guarantees all Internet websites to be immune to Man-In-The-Middle (MITM) attack.

Still further technical effect of one or more of the example embodiments disclosed herein is that risk for a single compromised CA is minimized.

Still further technical effect of one or more of the example embodiments disclosed herein is that a simplified process for domain/website owners is created.

Still further technical effect of one or more of the example embodiments disclosed herein is that new domains can be purchased with security feature at one place.

Still further technical effect of one or more of the example embodiments disclosed herein is that the system does not require the user to have a custom browser or run a blockchain node in the user node/device.

Yet another technical effect of one or more of the example embodiments disclosed herein is that less complex systems and nodes are required with limited storage and processing requirements.

Without in any way limiting the scope, interpretation, or application of the claims appearing below, a technical effect of one or more of the example embodiments disclosed herein is that an improved transaction data service system is provided.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. A method, comprising:
a computer-implemented method for secure de-centralized domain name system, comprising:
recording a domain registration transaction to a blockchain, the domain registration transaction comprising a domain name, deposit information associated with the domain, a domain primary key corresponding to a domain public key and domain certificate information for a server node;
encrypting the domain registration transaction using a random number;
releasing the random number to the blockchain in response to the domain registration transaction being confirmed into the blockchain according to a security protocol of the de-centralized domain name system;
recording a domain security transaction, comprising the domain public key, to the blockchain to generate a domain name record comprising the domain name, an associated IP address, the domain public key and the domain certificate information, wherein the domain security transaction being signed using the domain primary key;
transmitting, by a client node, a domain name request to a domain name node; receiving, by the client node, a domain name response from the domain name node, the domain name response comprising the domain public key, the domain certificate information and the associated IP address retrieved from the domain name record of the blockchain;
initiating a secure communication between the client node and the server node using at least one of the domain public key and the domain certificate information,
wherein the secure communication comprises at every nth block in response to domain registration withdrawing an amount corresponding to the deposit information associated with the domain using the domain primary key; and
depositing the withdrawn amount to miners of a blockchain network.

2. The method according to claim 1, wherein the deposit account is owned by a person or organization signing the domain security transaction.

3. The method according to claim 1, wherein the domain security transaction is recorded to the blockchain according to the security protocol of the de-centralized domain name system.

4. The method according to claim 3, wherein the security protocol comprising at least one of the following: Proof-of-Work (PoW), Proof-of-Stake (PoS), Practical Byzantine Fault Tolerance (PBFT) and majority-voting algorithm.

5. An apparatus comprising:
at least one processor; and
at least one memory including computer program code; the at least one memory and the computer program code configured to, with the at least one processor, cause the apparatus to:
transmit, from a client node, a domain name request to a domain name node, wherein a domain registration transaction is recorded to a blockchain, the domain registration transaction comprising a domain name, deposit information associated with the domain, a domain primary key corresponding to a domain public key and domain certificate information for a server node;
encrypt the domain registration transaction using a random number;
release the random number to the blockchain in response to the domain registration transaction being confirmed into the blockchain according to a security protocol of the de-centralized domain name system;
wherein a domain security transaction, comprising the domain public key, is recorded to the blockchain to generate a domain name record comprising the domain name, an associated IP address, the domain public key and the domain certificate information,
wherein the domain security transaction being signed using the domain primary key;
receive, by the client node, a domain name response from the domain name node, the domain name response comprising the domain public key, the domain certificate information and the associated IP address retrieved from the domain name record of the blockchain; and
initiate a secure communication between the client node and the server node using at least one of the domain public key and the domain certificate information,
wherein the secure communication comprises at every nth block in response to domain registration withdrawing an amount corresponding to the deposit information associated with the domain using the domain primary key; and
depositing the withdrawn amount to miners of a blockchain network.

6. The apparatus according to claim 5 comprising at least one of the following:
an industrial machine; a sensor; a personal computer; a smartphone; an Internet of Things (IoT) device, a Personal Digital Assistant (PDA); an Internet tablet; a network attached storage (NAS); and a user device.

7. The apparatus according to claim 5, wherein the deposit account is owned by a person or organization signing the domain security transaction.

8. The apparatus according to claim 5, wherein the domain security transaction is recorded to the blockchain according to the security protocol of the de-centralized domain name system.

9. The apparatus according to claim 8, wherein the security protocol comprising at least one of the following: Proof-of-Work (PoW), Proof-of-Stake (PoS), Practical Byzantine Fault Tolerance (PBFT) and majority-voting algorithm.

10. The apparatus according to claim 5, wherein the domain name request comprising at least one of the following: a domain name and an IP address associated with the domain name.

11. The apparatus according to claim 5, wherein the memory and computer program code are further configured to, with the processor, cause the apparatus to:
encrypt a random value using a shared secret and transmitting the encrypted random value to the server node;
receive an encrypted signed random value from the server node; decrypt the encrypted signed random value using the shared secret to generate the signed random value;
verify the server node using the signed random value with the domain public key of the server node; and
utilize the random value for encrypting data between the client node and the server node.

12. The apparatus according to claim 5, wherein the memory and computer program code are further configured to, with the processor, cause the apparatus to:
transmit a public key of the client node to the server node;
receive an encrypted response from the server node; decrypt the encrypted response using a private key of the client node to generate the domain public key and the domain certificate information;
compare the generated domain certificate information to the domain certificate information received from the domain name node to verify the server node;
generate a session key in response to verifying the server node, encrypting the session key using the domain public key;
transmit the encrypted session key to the server node; and
utilize the session key for encrypting data between the client node and the server node.

13. The apparatus according to claim 5, wherein the blockchain of the secure de-centralized domain name system comprising a plurality of blockchain node layers.

14. The apparatus according to claim 13, wherein the plurality of blockchain node layers comprising: a domain name node layer; a server node layer; and a client node layer.

15. A computer program embodied on a computer readable non-transitory medium comprising computer executable program code, which when executed by at least one processor of a device, causes the device to:
transmit, from a client node, a domain name request to a domain name node, wherein a domain registration transaction is recorded to a blockchain, the domain registration transaction comprising a domain name, deposit information associated with the domain, a domain primary key corresponding to a domain public key and domain certificate information for a server node;
encrypt the domain registration transaction using a random number;
release the random number to the blockchain in response to the domain registration transaction being confirmed into the blockchain according to a security protocol of the de-centralized domain name system;
wherein a domain security transaction, comprising the domain public key, is recorded to the blockchain to generate a domain name record comprising the domain name, an associated IP address, the domain public key and the domain certificate information, wherein the domain security transaction being signed using the domain primary key;
receive, by the client node, a domain name response from the domain name node, the domain name response comprising the domain public key, the domain certificate information and the associated IP address retrieved from the domain name record of the blockchain; and
initiate a secure communication between the client node and the server node using at least one of the domain public key and the domain certificate information,
wherein the secure communication comprises at every nth block in response to domain registration withdrawing an amount corresponding to the deposit information associated with the domain using the domain primary key; and depositing the withdrawn amount to miners of a blockchain network.

* * * * *